US009505375B2

(12) United States Patent
Kobayashi et al.

(10) Patent No.: US 9,505,375 B2
(45) Date of Patent: Nov. 29, 2016

(54) VEHICULAR SIDE AIRBAG DEVICE

(71) Applicant: Autoliv Development AB, Vårgårda (SE)

(72) Inventors: Yuto Kobayashi, Yokohama (JP); Yosuke Shimizu, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/766,403

(22) PCT Filed: Jan. 30, 2014

(86) PCT No.: PCT/JP2014/052057
§ 371 (c)(1),
(2) Date: Aug. 6, 2015

(87) PCT Pub. No.: WO2014/123055
PCT Pub. Date: Aug. 14, 2014

(65) Prior Publication Data
US 2015/0367811 A1    Dec. 24, 2015

(30) Foreign Application Priority Data

Feb. 7, 2013   (JP) ................ 2013-022763
Jul. 25, 2013  (JP) ................ 2013-154432

(51) Int. Cl.
*B60R 21/231*    (2011.01)
*B60R 21/2346*   (2011.01)
(Continued)

(52) U.S. Cl.
CPC ......... *B60R 21/2346* (2013.01); *B60R 21/233* (2013.01); *B60R 21/239* (2013.01); *B60R 21/23138* (2013.01); *B60R 2021/23146* (2013.01); *B60R 2021/23324* (2013.01)

(58) Field of Classification Search
CPC .......... B60R 2021/23146; B60R 2021/23324; B60R 21/23138; B60R 21/233
See application file for complete search history.

(56) References Cited

U.S. PATENT DOCUMENTS 8,757,657 B1 *  6/2014  Hotta ............... B60R 21/233
                                            280/730.2
9,120,457 B2 *  9/2015  Kino ............... B60R 21/207
(Continued)

FOREIGN PATENT DOCUMENTS

CN    101513863 A    8/2009
CN    101879885 A    11/2010
(Continued)

OTHER PUBLICATIONS

Goto et al., Airbag Device, JPO, JP 2011-121431 A, Machine Translation of Description.*

*Primary Examiner* — James English
(74) *Attorney, Agent, or Firm* — Brinks Gilson & Lione

(57) ABSTRACT

A side airbag device having a side airbag that can slide between an occupant and a vehicle side section, and allows occupant restraint by reaching. The side airbag can be inflated with the thickness of the portion that protects the peripheries of the occupant shoulder and waist is small and the thickness of the portion that protects the periphery of the chest region is large. Inside a side airbag, a rapid chamber extends from a seat back region over a top region and a bottom region and tapers towards the vehicle front; a delay chamber is positioned between the top region and bottom region, and a partitioning member partitions the interior of the side airbag into the delay chamber and the rapid chamber. An inflator is provided inside the rapid chamber.

19 Claims, 25 Drawing Sheets

(51) Int. Cl.
    *B60R 21/233*    (2006.01)
    *B60R 21/239*    (2006.01)

(56) References Cited

U.S. PATENT DOCUMENTS

| | | |
|---|---|---|
| 2008/0203711 A1 | 8/2008 | Shimono |
| 2009/0212539 A1 | 8/2009 | Honda et al. |
| 2010/0140907 A1 | 6/2010 | Shimono |
| 2010/0181749 A1* | 7/2010 | Sugimoto ............ B60R 21/2171 280/743.2 |
| 2011/0285119 A1* | 11/2011 | Yamamoto ........ B60R 21/23138 280/743.2 |
| 2012/0025499 A1* | 2/2012 | Shibayama ............ B60R 21/233 280/730.2 |
| 2012/0248746 A1* | 10/2012 | Yamamoto ........ B60R 21/23138 280/729 |
| 2012/0256400 A1 | 10/2012 | Shimono |
| 2015/0021887 A1* | 1/2015 | Hiraiwa ................ B60R 21/233 280/729 |
| 2015/0367806 A1* | 12/2015 | Fujiwara ............... B60R 21/233 280/729 |
| 2015/0367811 A1* | 12/2015 | Kobayashi .......... B60R 21/2346 280/730.2 |
| 2016/0031407 A1* | 2/2016 | Yamanaka ............ B60R 21/233 280/728.2 |
| 2016/0114757 A1* | 4/2016 | Fujiwara ........... B60R 21/23138 280/729 |
| 2016/0159310 A1* | 6/2016 | Kobayashi ........... B60R 21/233 280/729 |

FOREIGN PATENT DOCUMENTS

| | | | |
|---|---|---|---|
| CN | 102317122 A | 1/2012 | |
| CN | 102371961 A | 3/2012 | |
| DE | 10 2009 006 879 | 9/2009 | |
| EP | 1 832 475 A1 | 9/2007 | |
| EP | 2 412 585 A1 | 2/2012 | |
| EP | 2 396 197 B1 | 8/2013 | |
| JP | 2000-108835 | 4/2000 | |
| JP | 2000-185620 | 7/2000 | |
| JP | 2005-082068 | 3/2005 | |
| JP | WO 2006/049093 A1 | 5/2006 | |
| JP | 2009-196538 | 9/2009 | |
| JP | 2010-163142 | 7/2010 | |
| JP | 2010-184595 | 8/2010 | |
| JP | WO 2010/092454 A1 | 8/2010 | |
| JP | 2011-121431 | 6/2011 | |
| JP | WO 2011077510 A1 * | 6/2011 | ........ B60R 21/23138 |
| JP | 4846595 | 10/2011 | |
| JP | 2012-030614 | 2/2012 | |

\* cited by examiner

Ba-Ba CROSS-SECTION

Ca-Ca CROSS-SECTION (a)　　　　　　(b)

(a)          (b)

(a)          (b)

Ja-Ja
CROSS-SECTION (a)

Ka-Ka
CROSS-SECTION (b)

La-La
CROSS-SECTION (c)

(a)

(b)

VEHICULAR SIDE AIRBAG DEVICE

CROSS REFERENCE TO RELATED APPLICATIONS

This application claims priority to Japanese Patent Application Nos. 2013-022763, filed on Feb. 7, 2013; 2013-154432, filed on Jul. 25, 2013; and PCT International Patent Application No. PCT/JP2014/052057, filed on Jan. 30, 2014.

FIELD OF THE INVENTION

The present invention relates to a vehicular side airbag device having a side airbag that can slide quickly and smoothly into a gap between an occupant and a vehicle side section, and that allows restraining the occupant by rapidly reaching the particularly wide shoulder and waist of the occupant; at the same time, the side airbag can be inflated so that the thickness of the portion thereof that protects the peripheries of the skeletally firm shoulder and waist is small and the thickness of the portion that protects the periphery of the skeletally weak chest is large.

DESCRIPTION OF THE RELATED ART

Vehicular side airbag devices are known that have a side airbag, built into a seat, that deploy and inflate, in the direction from the vehicle rear towards the vehicle front, between an occupant and a vehicle side section, as a result of introduction of an inflator gas from an inflator. The side airbag may be provided with a tether and/or a separation wall for the purpose of adjusting the manner in which the side airbag is inflated, or dividing the interior of the side airbag into a plurality of chambers. For example, Japanese Patent Application Publication Nos. 2005-82068 and 2000-108835 disclose known instances of such vehicular side airbag devices.

The goal in the "side airbag device" of Japanese Patent Application Publication No. 2005-82068 is to provide a side airbag device that is capable of effectively protecting an occupant, through modification of the pressure distribution in the airbag at the time of deployment and inflation. To that end, the airbag is configured in such a manner that the interior thereof is partitioned, by a pair of seams, into three compartments, namely a top compartment, a central compartment and a bottom compartment in the top-bottom direction, such that these compartments communicate with each other. A gas jetting opening of an inflator is disposed only in the top compartment and the bottom compartment.

The goal of the "airbag device" in Japanese Patent Application Publication No. 2000-108835 is to prevent rupture, due to high-pressure gas, of a sewn section of the airbag and a tether belt that regulates the airbag so as to inflate and deploy to a predetermined shape, and to reduce the size and weight of the airbag device. Herein, the airbag is inflated and deployed by high-pressure gas, jetted through an inflator, on account of the impact during a collision; at least one tether belt is provided, for regulating the airbag to inflate and deploy to a predetermined shape, inside the airbag that protects an occupant against the collision impact; a fixed section of the base fabric of the airbag and the tether belt is sewn by two rows of sewn sections, including a first sewn section and a second sewn section, disposed parallel to each other in the longitudinal direction of the tether belt; such that the second sewn section, which stands closer to the center than the first sewn section that is positioned at the end of the tether belt, is configured to break or loosen readily under a tensile force that is exerted on the tether belt during in inflation of the airbag.

A side airbag in a vehicular side airbag device protects the waist, shoulder and chest of an occupant from a vehicle side section. Thus, the side airbag has to intrude quickly into the gap between the occupant and the vehicle side section. In particular, the shoulder and waist of the occupant are wide portions, and the side airbag must reach, as rapidly as possible, these portions, and inflate thereupon in order to restrain the occupant. Further, the occupant must be protected through proper catching, of the shoulder and waist, which are relatively skeletally firm, and the chest, which is skeletally weak, with one side airbag.

The airbag in Japanese Patent Application Publication No. 2005-82068 is problematic in that the portion that catches first the shoulder and the waist inflates more widely than the portion that catches subsequently the chest with a delay. As a result, the airbag does not intrude readily into the gap between the occupant and the vehicle side section, and, accordingly, it is difficult for the airbag to reach instantly the peripheries of the shoulder and waist, while the restraining action on the chest is insufficient as compared with that on the firm shoulder and waist.

SUMMARY OF THE INVENTION

In the light of the above conventional problems, it is an object of the present invention to provide a vehicular side airbag device wherein a side airbag can be caused to slide quickly and smoothly into a gap between an occupant and a vehicle side section, and the side airbag can restrain the occupant by reaching instantly the particularly wide shoulder and waist, and wherein, at the same time, the side airbag can be inflated in such a manner that the thickness of the portion thereof that protects the peripheries of the skeletally firm shoulder and waist is small and the thickness of the portion that protects the periphery of the skeletally weak chest is large.

The vehicular side airbag device of the present invention is a vehicular side airbag device that has a side airbag built into a seat and that, due to introduction of an inflator gas from an inflator, deploys and inflates, in a direction from a vehicle rear towards a vehicle front, into a gap between an occupant and a vehicle side section, wherein inside the side airbag there are provided a rapid chamber extending from a seat back region over a top region and a bottom region that taper gradually towards the vehicle front, a delay chamber positioned between the top region and the bottom region on the vehicle-front side of the seat back region, and a front-rear partitioning section that partitions the interior of the side airbag into the delay chamber and the rapid chamber; and the inflator is provided inside the rapid chamber.

Preferably, the front-rear partitioning section is provided with at least one of an upper communication port through which the top region communicates with the delay chamber, and a lower communication port through which the bottom region communicates with the delay chamber.

Preferably, the width of the front-rear partitioning section, in the vehicle width direction, is set to be large at a position in the seat back region, and small at a position in the top region and the bottom region.

Preferably, the front-rear partitioning section is convexly curved upwardly and obliquely rearward with respect to the vehicle front-rear direction, at a portion of transition from the seat back region to the top region.

Preferably, the front-rear partitioning section is convexly curved downwardly and obliquely rearward with respect to the vehicle front-rear direction, at a portion of transition from the seat back region to the bottom region.

Preferably, a top-bottom partitioning section that partitions the rapid chamber into an upper rear bag region that includes the top region and into a lower bag region that includes the bottom region is provided inside the side airbag.

Preferably, a supplementary communication port through which the seat back region communicates with the bottom region is provided in the top-bottom partitioning section.

Preferably, a duct that guides the inflator gas in a direction from the vehicle rear towards the vehicle front is provided in the top-bottom partitioning section.

Preferably, the angle formed by the top-bottom partitioning section and the front-rear partitioning section, with respect to the vehicle-rear side, is set to an acute angle.

The vehicular side airbag device of the present invention is a vehicular side airbag device having a side airbag built into a seat and that, due to introduction of an inflator gas from an inflator, deploys and inflates in a direction from a vehicle rear towards a vehicle front, between an occupant and a vehicle side section, the vehicular side airbag device comprising: a top-bottom partitioning section that is formed inside the side airbag, in a vehicle front-rear direction, and that divides the interior of the side airbag into a lower bag region and an upper bag region; and a front-rear partitioning section that is formed, inside the side airbag, from the top-bottom partitioning section towards the top of the vehicle, and that divides the upper bag region into an upper front bag region and an upper rear bag region, wherein the lower bag region and the upper rear bag region form a rapid chamber, and the upper front bag region forms a delay chamber; the inflator is disposed, on the vehicle-rear side inside the rapid chamber, from the upper rear bag region over the lower bag region; and a front-rear direction vent that allows the upper rear bag region of the rapid chamber to communicate with the delay chamber is provided in the front-rear partitioning section.

Preferably, the side airbag comprises at least an exterior-side panel and an interior-side panel, and the front-rear partitioning section is formed through joining of the exterior-side panel and the interior-side panel.

Preferably, the side airbag comprises a complementary exterior-side panel and a complementary interior-side panel that are respectively joined to the outer side of the exterior-side panel and the outer side of the interior-side panel, the complementary panels extend towards the vehicle front further than the front-rear partitioning section, and the delay chamber is formed on the vehicle-front side of the front-rear partitioning section, through joining of the complementary panels to each other.

Preferably, the front-rear partitioning section is formed through joining of an overlap site where the exterior-side panel and the complementary exterior-side panel overlap, to an overlap site where the interior-side panel and the complementary interior-side panel overlap.

Preferably, an additional panel is provided, overlapping inner faces of the exterior-side panel and the interior-side panel, in the lower bag region of the rapid chamber; and the top-bottom partitioning section is formed through joining of opposing sides of the additional panel.

Preferably, a sealing valve that is sealed off through a rise in internal pressure in the lower bag region of the rapid chamber is provided in the top-bottom partitioning section.

Preferably, the additional panel forms an inflator mounting duct from the lower bag region of the rapid chamber over the upper rear bag region, inside the side airbag, and a sealing valve that is sealed off due to a rise in internal pressure in the lower bag region is provided in the inflator mounting duct.

Preferably, the front-rear direction vent is formed by a slit.

Preferably, a top-bottom direction vent that allows the lower bag region of the rapid chamber to communicate with the delay chamber is provided in the top-bottom partitioning section.

Preferably, a gas jetting hole of the inflator is set, in the rapid chamber, on the side of the lower bag region.

Preferably, the side airbag is set so that the lower bag region of the rapid chamber is positioned at the periphery of the occupant's waist, the upper rear bag region of the rapid chamber is positioned at the periphery of the occupant's shoulder, and the delay chamber is positioned at the periphery of the occupant's chest.

In the vehicular side airbag device of the present invention, the side airbag can be caused to slide, quickly and smoothly, into the gap between an occupant and a vehicle side section, and the occupant can be restrained in that the side airbag reaches instantly the particularly wide shoulder and waist; at the same time, the side airbag can be inflated in such a manner that the thickness of the portion thereof that protects the peripheries of the skeletally firm shoulder and waist is small and the thickness of the portion that protects the periphery of the skeletally weak chest is large.

BRIEF DESCRIPTION OF THE DRAWINGS

FIG. 12A is a front-view diagram, and FIG. 12B is a cross-sectional diagram taken along an Aa-Aa view line of FIG. 12A;

FIG. 20A is a partial cutaway side-view diagram, and FIG. 20B is a cross-sectional diagram taken along a Ga-Ga view line in FIG. 20A;

FIG. 23a is a perspective-view diagram in a closed state, and FIG. 23b is a perspective-view diagram in an open state;

DESCRIPTION OF THE PREFERRED EMBODIMENTS

Figure 1:
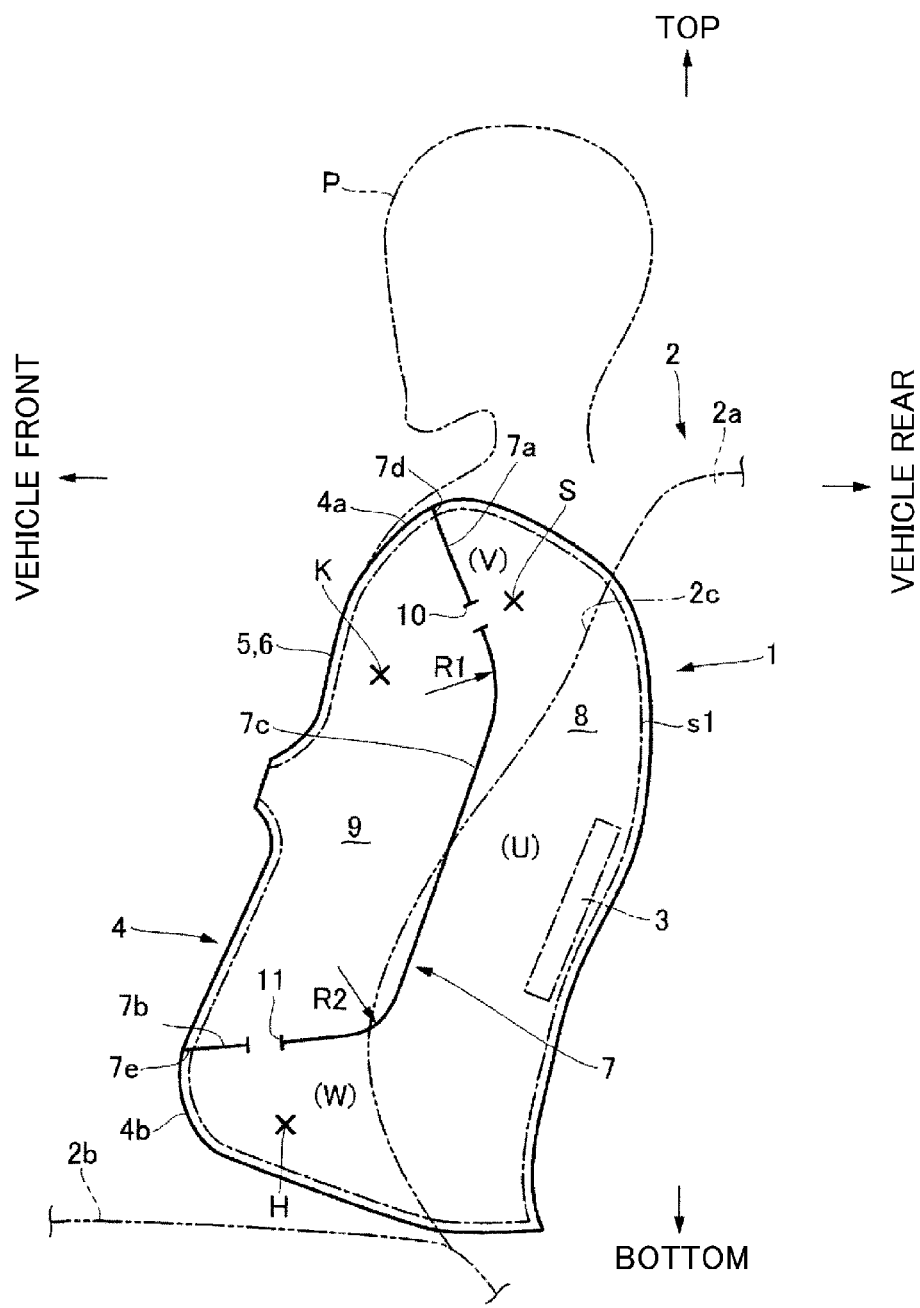
FIG. 1 is a schematic side-view diagram illustrating a conceptual configuration of a first embodiment, being a basic embodiment of the vehicular side airbag device according to the present invention.

Preferred embodiments of the vehicular side airbag device according to the present invention will be explained next in detail with reference to accompanying drawings. FIG. 1 is a schematic side-view diagram illustrating a conceptual configuration of a first embodiment, being a basic embodiment of the vehicular side airbag device according to the present invention, FIG. 2 is a schematic plan-view diagram of the conceptual configuration illustrated in FIG. 1, and FIG. 3 is a view in direction A, of FIG. 2.

Figure 2:
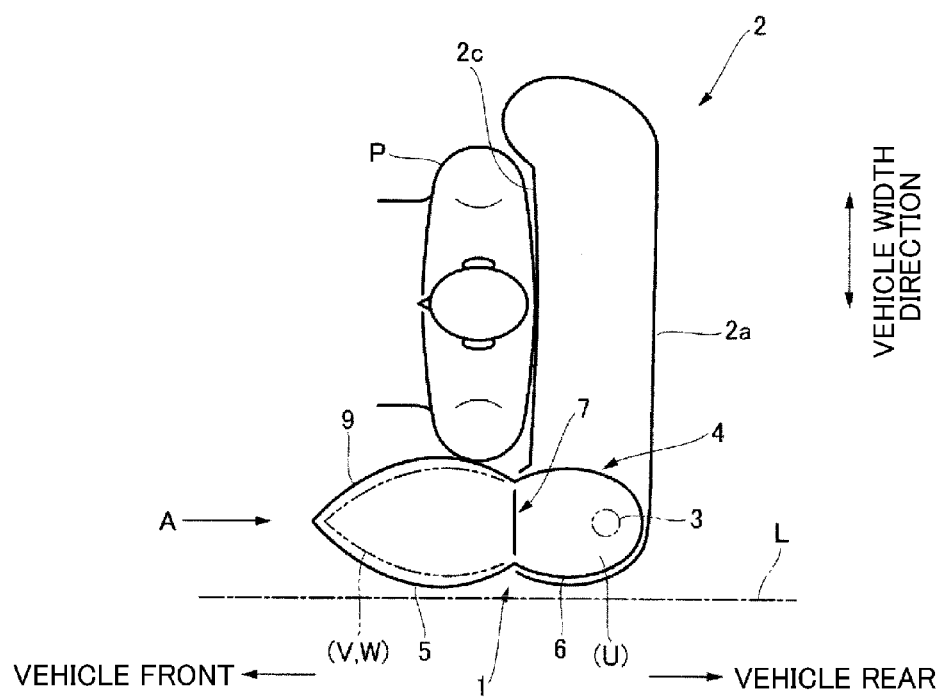
FIG. 2 is a schematic plan-view diagram of the conceptual configuration depicted in FIG. 1.
Figure 3:
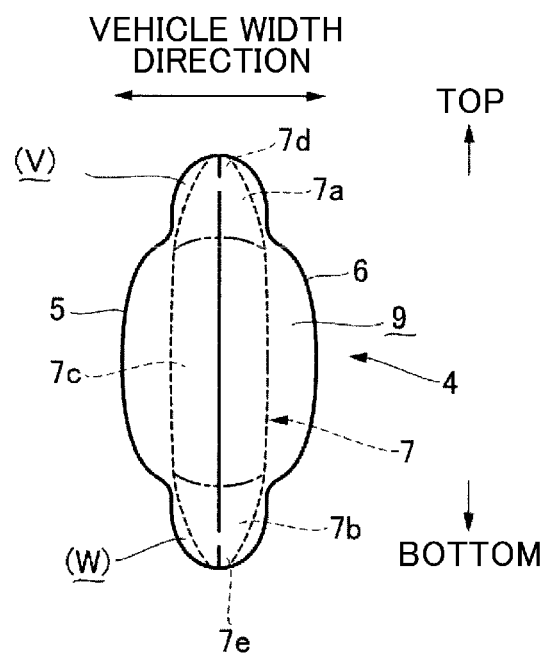
FIG. 3 is a view in direction A, of FIG. 2.

As illustrated in FIG. 1 to FIG. 3, a vehicular side airbag device 1 comprises a side airbag 4 that is built into a seat back 2a of a seat 2, and that, due to introduction of an inflator gas through an inflator 3, deploys and inflates in a direction from a vehicle rear (seat back 2a side) towards a vehicle front (front end-side of a seat cushion 2b), at a gap between an occupant P and a vehicle side section L.

The vehicular side airbag device 1 is mainly configured by comprising the side airbag 4 and the inflator 3. The side airbag 4 is configured by comprising a cabin-side panel 5 and an exterior-side panel 6, as illustrated in FIG. 2 and FIG. 3. The panels 5, 6 are formed of a flexible material capable of deploying and inflating from a stored state, as is well known in the technical field of airbags for vehicles.

Upon deployment of the side airbag 4, the exterior-side panel 6 faces a vehicle side section L, for instance a door inner face or side window inner face. Upon deployment of the side airbag 4, the cabin-side panel 5 faces the occupant P. The panels 5, 6 are configured to be integrally joined to each other along an outer peripheral edge seam line s1, to form thereby the side airbag 4 as a bag that inflates by virtue of the inflator gas. The side airbag 4 may be configured in the form of a bag-like shape through folding back of a single panel body, of a size equivalent to that of the cabin-side and the vehicle exterior-side panels 5, 6 when the latter are joined together, and through joining of the folded panel at the outer peripheral edge seam line s1.

The panels 5, 6 are configured to take on any form, ranging from a circular shape to a quadrangular shape, including polygonal shapes. In the example illustrated in the figures, the panels 5, 6 are formed to a substantially quadrangular shape. The side airbag 4 is thus inflated to a quadrangular shape when viewed in the vehicle width direction.

The side airbag 4 is brought to a stored state by being folded or the like, and is housed inside the seat back 2a. When the side airbag 4 deploys and inflates, a rear edge thereof, at the rear in the vehicle front-rear direction, becomes positioned on the seat back 2a side, an upper edge and a lower edge of the side airbag 4, in the vehicle top-bottom direction protrude upwards and downward, respectively, and a front edge protrudes towards the vehicle front, along the seat cushion 2b.

Inside the side airbag 4 there is provided a band-like partitioning member 7, as a partition that divides the interior of the side airbag 4 into at least two chambers. The partitioning member 7 functions as a front-rear partitioning section, in the sense of partitioning the interior of the side airbag 4 into front and rear. In the first embodiment illustrated in FIG. 1 to FIG. 3, the interior of the side airbag 4 is partitioned into two chambers. The partitioning member 7 is formed of a flexible material similar to that of the panels 5, 6.

As illustrated in FIG. 3, the partitioning member 7 is disposed in such a manner that the length direction thereof runs in the top-bottom direction of the vehicle, in other words substantially in the top-bottom direction of the side airbag 4 when the latter is in a deployed and inflated state. The width direction of the partitioning member 7 runs along the vehicle width direction. The width dimension of the partitioning member 7 is formed such that an upper section 7a and a lower section 7b are narrower than a central section 7c, in the length direction of the partitioning member 7.

In more detailed terms, the width dimension of the central section 7c of the partitioning member 7 is set to be substantially constant. The width dimension of the upper section 7a is set to taper gradually from the central section 7c towards a tip 7d of the upper section 7a, the width dimension decreasing gradually thus from the central section 7c towards the upper tip 7d. The width dimension of the lower section 7b is set to taper gradually, similarly to the upper section 7a, from the central section 7c to a tip 7e of the lower section 7b, the width dimension decreasing gradually from the central section 7c towards the lower tip 7e.

In order to partition the interior of the side airbag 4, both side edges of the partitioning member 7 in the width direction are joined to the inner faces of the cabin-side panel 5 and of the exterior-side panel 6, and the upper tip 7d and the lower tip 7e are integrated with the panels 5, 6 by the outer peripheral edge seam line s1.

As illustrated in FIG. 1, the partitioning member 7 is provided so as to yield the below-described arrangement configuration when the side airbag 4 is deployed and inflated. The central section 7c of the partitioning member 7 is positioned so as to run substantially along the a back abutting surface 2c of the seat back 2a; the central section 7c of the partitioning member 7 is positioned in the vicinity of the back abutting surface 2c. The upper section 7a of the partitioning member 7 is positioned so as to extend, from the central section 7c, upwardly and obliquely frontward, in the vehicle front-rear direction. The lower section 7b of the partitioning member 7 is positioned so as to extend, from the central section 7c, downwardly and obliquely frontward in the vehicle front-rear direction.

Briefly, the partitioning member 7 is formed to a bow riser shape wherein the central section 7c of the partitioning member 7 is positioned substantially in the top-bottom direction in the interior of the side airbag 4, upper section 7a is bent obliquely upward, from the central section 7c towards the vehicle front, and the lower section 7b is bent obliquely downward, from the central section 7c, towards the vehicle front.

In the example illustrated in the figures, the side airbag 4 is depicted inflated to a substantially quadrangular shape, when viewed in the vehicle width direction, such that the upper section 7a of the partitioning member 7 is provided so as to point, from the back abutting surface 2c of the seat back 2a, to a corner section 4a of the vehicle front top end of the side airbag 4, or the periphery of the corner section 4a, and the lower section 7b of the partitioning member 7 is provided so as to point, from the back abutting surface 2c of the seat back 2a, towards a corner section 4b of the vehicle front lower end of the side airbag 4, or to the periphery of the corner section 4b.

Two chambers are formed in the interior of the side airbag 4 that is partitioned by the single partitioning member 7. One of the chambers is a rapid chamber 8 and the other chamber is a delay chamber 9. An inflator 3 that jets an inflator gas is provided inside the rapid chamber 8. The inflator 3 is provided, inside the rapid chamber 8, fixedly mounted to the seat back 2a. No inflator is provided inside the delay chamber 9.

The rapid chamber 8 is a chamber that deploys and inflates first through immediate introduction of inflator gas directly from the inflator 3. The delay chamber 9 is a chamber that deploys and inflates subsequently due to introduction of inflator gas from the rapid chamber 8, as described below.

In the rapid chamber 8, formed in the partitioning member 7 having the above form and layout, there is formed a seat back region U, between the central section 7c of the partitioning member 7 and a rear edge of the side airbag 4; herein, the seat back region U deploys and inflates substantially inside the seat back 2a. A top region V that deploys and inflates at the shoulder (denoted by the reference symbol S in FIG. 1) of an occupant P, and at the periphery of the shoulder, is formed between a portion of the side airbag 4, and the upper section 7a of the partitioning member 7, from the rear edge over the upper edge. A bottom region W that deploys and inflates at the waist (denoted by the reference symbol H in FIG. 1) of the occupant P, and at the periphery of the waist, is formed between a portion of the side airbag 4, from the rear edge to the lower edge, and the lower section 7b of the partitioning member 7.

The inflator 3 is preferably provided by being positioned at the seat back region U in such a manner that the inflator gas firstly deploys and inflates the seat back region U, and subsequently flows smoothly into the top region V and the bottom region W.

As illustrated in FIG. 3, the width dimension of the upper section 7a of the partitioning member 7 is set, as described above, to decrease gradually from the central section 7c of the partitioning member 7 towards the upper tip 7d. Therefore, the top region V is formed tapering gradually towards the vehicle front. At the same time, as illustrated in FIG. 1, the upper section 7a of the partitioning member 7 is positioned so as to extend upwardly and obliquely frontward from the central section 7c of the partitioning member 7, as described above. Therefore, the top region V is formed tapering gradually, with decreasing distance to the upper edge of the side airbag 4, towards the vehicle front. The width of the top region V in the vehicle width direction is defined by the width dimension of the upper section 7a of the partitioning member 7, such that the top region V is deployed and inflated over a small thickness that becomes yet smaller towards the upper tip 7d.

Similarly, the width dimension of the lower section 7b of the partitioning member 7 is set, as described above, to decrease gradually from the central section 7c of the partitioning member 7 towards the lower tip 7e. Therefore, the bottom region W as well is formed tapering gradually towards the vehicle front. At the same time, the lower section 7b of the partitioning member 7 is positioned so as to extend, downwardly and obliquely frontward, from the central section 7c of the partitioning member 7, as described above. Therefore, the bottom region W is formed tapering gradually, with decreasing distance to the lower edge of the side airbag 4, towards the vehicle front. The width of the bottom region W in the vehicle width direction is defined by the width dimension of the lower section 7b of the partitioning member 7, such that the bottom region W is deployed and inflated over a small thickness that becomes yet smaller towards the lower tip 7e.

The width dimensions of the upper section 7a and the lower section 7b of the partitioning member 7 may be set to be identical or different. The width of the central section 7c of the partitioning member 7 is substantially constant and relatively larger than that of the upper section 7a and the lower section 7b. Therefore, the seat back region U adopts a substantially hollow cylindrical form, in the top-bottom direction, of greater capacity than that of the top region V and the bottom region W, and deploys and inflates stably, quickly and smoothly.

From the viewpoint of the regions U, V, W of the rapid chamber 8, the width of the partitioning member 7 in the vehicle width direction is set to be large at the position of the seat back region U, and to be small at a the positions of the top region V and the bottom region W. In more detailed terms, the bent portion, in the partitioning member 7, that transitions from the seat back region U to the top region V, is curved convexly (see reference symbol R1 in FIG. 1) upwardly and obliquely rearward, with respect to the vehicle front-rear direction, in order to feed the inflator gas smoothly towards the upper edge of the side airbag 4. Further, the bent portion, in the partitioning member 7, that transitions from the seat back region U to the bottom region W, is curved convexly (see reference symbol R2 in FIG. 1) downwardly and obliquely rearward, with respect to the vehicle front-rear direction, in order to feed the inflator gas smoothly towards the lower edge of the side airbag 4.

The delay chamber 9 is positioned frontward of the seat back region U of the rapid chamber 8, between the central section 7c of the partitioning member 7 and the front edge of the side airbag 4, below the top region V and above the bottom region W, the delay chamber 9 being formed so as to deploy and inflate at the chest of the occupant P (denoted by the reference symbol K in FIG. 1), and the periphery of the chest. The width of a main portion of the delay chamber 9, excluding the portion directly below the top region V and the region directly above the bottom region W, is defined by the central section 7c of the partitioning member 7, such that the delay chamber 9 is deployed and inflated, to a large thickness, in the vehicle width direction and towards the vehicle front.

In order to feed the inflator gas from the rapid chamber 8 into the delay chamber 9, an upper communication port 10 through which the top region V communicates with the delay chamber 9, and a lower communication port 11 through which the bottom region W communicates with the delay chamber 9, are provided in the partitioning member 7. The ports 10, 11 are configured as holes formed running through the upper section 7a and the lower section 7b of the partitioning member 7. As a result, part of the inflator gas with which the rapid chamber 8 is filled is supplied into the delay chamber 9.

The effect of the vehicular side airbag device according to the first embodiment will be explained next. Firstly, the inflator gas that has been jetted through the action of the inflator 3 fills instantly the seat back region U of the rapid chamber 8. The seat back region U is a simple hollow cylinder, and hence the interior of the seat back 2a deploys and inflates stably at once, smoothly and quickly.

When the seat back region U deploys and inflates, the inflator gas flows immediately into both the top region V and the bottom region W of the rapid chamber 8, and the top region V and the bottom region W deploy and inflate quickly, virtually without delay with respect to the seat back region U.

The top region V and the bottom region W are formed tapering gradually from the seat back region U towards the vehicle front. Therefore, the pointed tips 7d, 7e of the top region V and the bottom region W jump forward, from the seat back 2a towards the vehicle front, by virtue of reaction forces against the seat back region U that is inflated stably over a large volume, while thanks to the tapering cross-section of the top region V and the bottom region W, the latter thrust forward instantly, at an accelerated rate, and deployment and inflation of the top region V and the bottom region W are complete simultaneously with this forward thrust.

The thickness of the top region V and bottom region W decreases tapering off in the vehicle width direction; as a result, the top region V and bottom region W can slide and reach into the gap between the occupant P and the vehicle side section L smoothly and quickly. The top region V and bottom region W reach instantly the wide shoulder S and periphery thereof, and the wide waist H and periphery thereof, of the occupant. Thereby, the occupant P can be restrained in that the shoulder S, the waist H and the peripheries thereof can be caught quickly.

Part of the inflator gas that fills the top region V and bottom region W flows into the delay chamber 9 through the upper communication port 10 and the lower communication port 11. The inflator gas causes the delay chamber 9 to be deployed and inflated with a slight delay with respect to the rapid chamber 8. The chest K, and periphery thereof, of the occupant P is caught and protected as a result.

The width of the partitioning member 7 in the vehicle width direction is relatively greater at the central section 7c than at the upper section 7a and the lower section 7b. Therefore, this allows making the thickness of the delay chamber 9 greater in the vehicle width direction, and protecting properly of the skeletally weak chest K of the occupant P. The thickness of the top region V and bottom region W is made smaller at the shoulder S and the waist H, which are skeletally firmer than the chest K. As a result, the top region V and bottom region W can be made to smoothly reach in between the occupant P and the vehicle side section L, and the occupant P can be protected through accurate catching and restraining of the sites S, H, at an early stage of deployment and inflation of the side airbag 4.

In the first embodiment, in essence, the partitioning member 7 is provided inside of the side airbag 4, and partitions the interior of the latter into the rapid chamber 8, which extends, from the seat back region U, over the top region V and bottom region W having a gradually tapering form towards the vehicle front, and into the delay chamber 9, which is positioned between the top region V and bottom region W, on the vehicle-front side of the seat back region U. Therefore, it becomes possible to cause the side airbag 4 to slide, quickly and smoothly, into the gap between the occupant P and the vehicle side section L, and to restrain the occupant in that the side airbag 4 reaches instantly the particularly wide shoulder S and waist H. At the same time, the side airbag 4 can be inflated to a form such that, through setting of the shape of the partitioning member 7, the thickness of the portions that protect the peripheries of the skeletally firm shoulder S and waist H are small, while the thickness of the portion that protects the periphery of the skeletally weak chest K is large, as a result of which occupant protection performance can be significantly improved.

The width of the partitioning member 7 in the vehicle width direction is set to be large at the position of the seat back region U, and to be small at the positions of the top region V and bottom region W. Therefore, the side airbag 4 can be deployed and inflated in a form wherein the thickness of the portion that protects the peripheries of the skeletally firm shoulder S and waist H described above is small, and the thickness of the portion that protects the periphery of the skeletally weak chest K is large.

The partitioning member 7 is convexly curved (R1), upwardly and obliquely rearward with respect to the vehicle front-rear direction, at a portion of transition from the seat back region U to the top region V. Therefore, the inflator gas can be fed smoothly from the seat back region U towards the upper edge of the side airbag 4, and the pointed tip 7d of the top region V can be caused to slide quickly into the gap between the occupant P and the vehicle side section L, whereby the shoulder S and periphery thereof of the occupant P can be properly restrained.

The partitioning member 7 is convexly curved (R2), downwardly and obliquely rearward with respect to the vehicle front-rear direction, at a portion of transition from the seat back region U to the bottom region W. Therefore, the inflator gas can be fed smoothly from the seat back region U towards the lower edge of the side airbag 4, and the pointed tip 7e of the bottom region W can be caused to slide quickly into the gap between the occupant P and the vehicle side section L, whereby the waist H and periphery thereof of the occupant P can be properly restrained.

The thickness of the side airbag 4 in the vehicle width direction can be easily modified through adjustment of the width of the partitioning member 7. The width dimension of the partitioning member 7 may be modified as appropriate, in the length direction as well, so as to obtain a necessary dissimilar thickness at any site from the upper edge over the lower edge of the side airbag 4.

Figure 4:
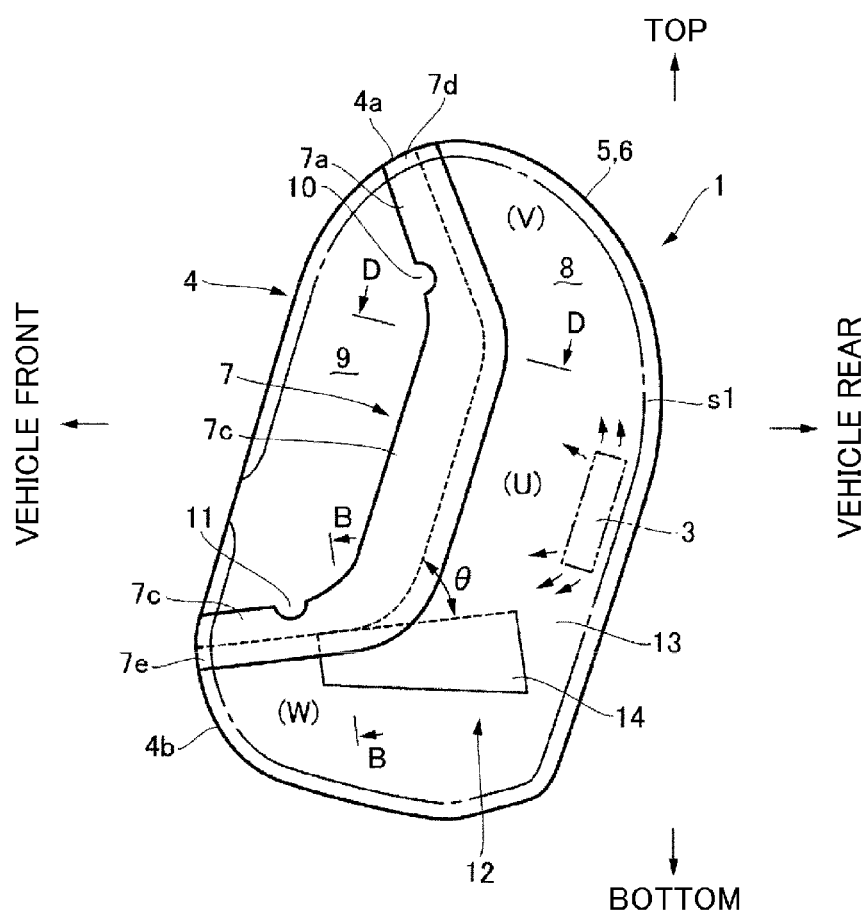
FIG. 4 is a side-view diagram of a state resulting from removing one panel, illustrating a first variation of the vehicular side airbag device depicted in FIG. 1.
Figure 5:
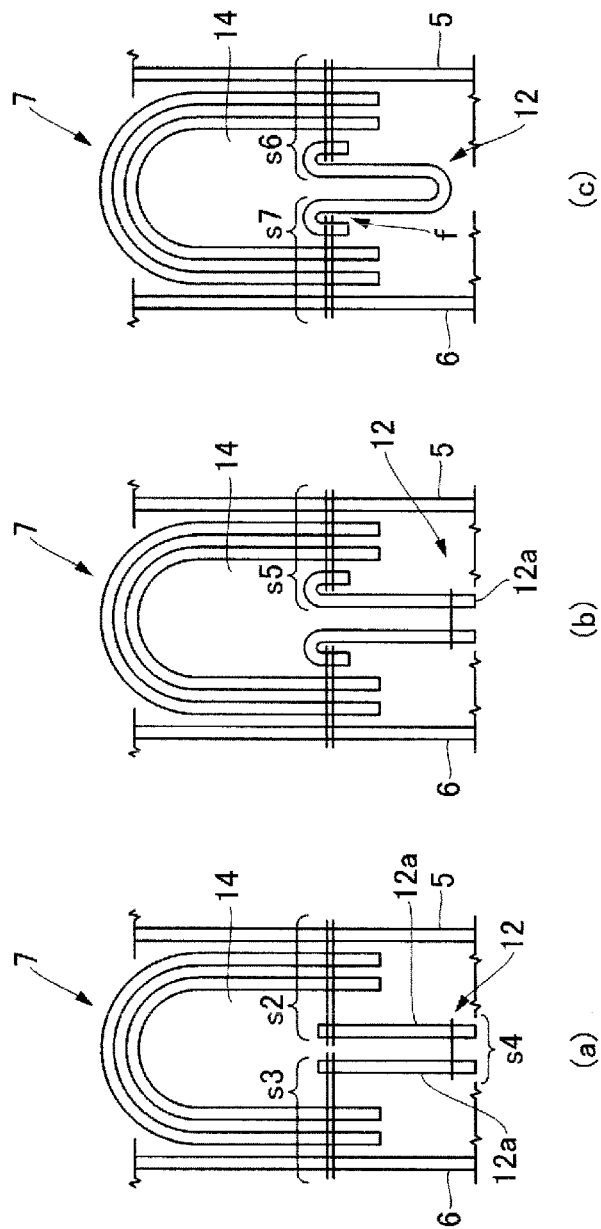
FIG. 5 (a,b,c) is an explanatory diagram illustrating various examples of cross-sections taken along a B-B view line of FIG. 4.

FIG. 4 and FIG. 5(a,b,c) illustrate a first variation of the first embodiment. FIG. 4 is a side-view diagram of a state resulting from removing one of the panels of the vehicular side airbag device, and FIG. 5 (a,b,c) is an explanatory diagram illustrating various examples of cross-sections taken along a B-B view line of FIG. 4. FIG. 4 illustrates the side airbag 4 prior to being folded. In the first variation there is illustrated the partitioning member 7 being used with half-folded in the width direction. This partitioning member 7 can be used as a concrete example of the first embodiment.

In the first variation, a band-like supplementary partitioning member 12 is provided, as a supplementary partition, in the interior of the side airbag 4, in addition to the partitioning member 7. The supplementary partitioning member 12 partitions the bottom region W from the seat back region U.

The supplementary partitioning member 12, which is a supplementary partition, functions as a top-bottom partitioning section in the meaning of partitioning the rapid chamber 8 vertically. The supplementary partitioning member 12 partitions the rapid chamber 8 into an upper rear bag region (site of the side airbag at the top, in the vehicle top-bottom direction, and at the rear, in the vehicle front-rear direction) that includes the top region V, and into a lower bag region (site of the side airbag at the bottom, in the vehicle top-bottom direction) that includes the bottom region W. The partitioning member 7 forms the delay chamber at an upper front bag region (site of the side airbag at the top, in the vehicle top-bottom direction, and at the front, in the vehicle front-rear direction).

In order to cause the inflator gas to flow from the inflator 3 in the seat back region U towards the bottom region W, a supplementary communication port 13 through which the seat back region U communicates with the bottom region W is provided in the supplementary partitioning member 12. The supplementary communication port 13 may be provided in the supplementary partitioning member 12. Alternatively, as illustrated in the figures, a gap may be set between the supplementary partitioning member 12 and the rear edge of the side airbag 4, this gap being used as the supplementary communication port 13. In brief, the supplementary communication port 13 becomes provided in the interior of the interior of the side airbag 4 as a result of the supplementary partitioning member 12 being provided in the latter.

The supplementary partitioning member 12 may be disposed in any manner, for the purpose of partitioning the bottom region W and the seat back region U. Preferably, the supplementary partitioning member 12 is disposed with part thereof overlapping the partitioning member 7, as illustrated in FIG. 4, in such a manner that continuity with the partitioning member 7 can be secured. In the example illustrated in the figures, the supplementary partitioning member 12 is formed towards the rear edge of the side airbag 4 along the upper edge of the bottom region W, in the vehicle front-rear direction, over an appropriate length so as to form the supplementary communication port 13. As a result, in the first embodiment the side airbag 4 having a two-chamber structure, namely the rapid chamber 8 and the delay chamber 9, can be configured herein as a pseudo-three-chamber structure.

At a portion where the supplementary partitioning member 12 and the partitioning member 7 overlap, an angle θ formed by the partitioning member 7 and the supplementary partitioning member 12 with respect to the vehicle-rear side, in other words on the side facing the inflator 3, is set to be an acute angle. Thus, the supplementary partitioning member 12 in the vehicle front-rear direction and the portion, of the partitioning member 7, that is convexly curved, downwardly and obliquely rearward in the vehicle front-rear direction (see reference symbol R2 in FIG. 1) can be disposed so as to come close to each other, with a narrowing gap therebetween.

A duct 14 that guides the inflator gas in a direction from a vehicle rear towards a vehicle front is provided in the supplementary partitioning member 12 that is used in the first variation. FIG. 5a illustrates a first example of the supplementary partitioning member 12 with the duct 14. The supplementary partitioning member 12 is made up of two long strips 12a in the vehicle front-rear direction. In the present example, the partitioning member 7 is a double-ply member.

The foregoing will be explained next according to the fabrication procedure of the side airbag 4. Firstly, one side edge of one of the strips 12a and one side edge of the partitioning member 7, and one of the panels, herein, the panel 5, are superimposed and joined (s2). Next, one side edge of the other strip 12a, the other side edge of the partitioning member 7, and the other panel 6, are superimposed and joined, so as to sandwich the supplementary partitioning member 12 therebetween (s3). The two side edges of the partitioning member 7 are joined to the panels 5, 6, over the entire length of the partitioning member, to form as a result the rapid chamber 8 and the delay chamber 9.

Next, the other side edges of the two strips 12a are superimposed on each other and are joined (s4). Lastly, the panels are joined by the outer peripheral edge seam line s1 of the side airbag 4. The hollow cylindrical duct 14 becomes formed as a result between the partitioning member 7 and the supplementary partitioning member 12 that is made up of the two strips 12a.

FIG. 5b illustrates a second example. In the second example, one side edge of each strip 12a that is joined to the partitioning member 7 is folded back towards the partitioning member 7, and the whole is joined (s5). By adopting this configuration, the half-folded partitioning member 7 can spread easily, and the inflator gas can be allowed to flow more properly.

FIG. 5c illustrates a third example. In the supplementary partitioning member 12 of the third example, one single strip is used half-folded in the width direction. Folding back of the supplementary partitioning member 12 is identical to that in the second example.

In the third example, one side edge of the supplementary partitioning member 12, one side edge of the partitioning member 7 and one of the panels, herein, the panel 5, are superimposed on each other and are joined (s6). Thereafter, the other side edge of the supplementary partitioning member 12, the other side edge of the partitioning member 7 and the other panel 6 are superimposed on each other and are joined, securing a joining margin by a fold-back f of the other side edge of the supplementary partitioning member 12 (s7). Lastly, the panels are joined by the outer peripheral edge seam line s1 of the side airbag 4. The supplementary partitioning member 12 having the duct 14 can be built this way into the side airbag 4.

By providing the duct 14, the inflator gas can be fed smoothly towards the pointed tip 7e of the bottom region W along the upper edge of the bottom region W, even in a pseudo-three-chamber structure by the supplementary partitioning member 12, and the waist H and periphery thereof are caught early and reliably, whereby the occupant P can be protected properly.

By setting an acute angle as the angle θ formed by the supplementary partitioning member 12 and the partitioning member 7 with respect to the vehicle rear, it becomes possible to increase the joining strength of the partitioning member 7 and the supplementary partitioning member 12 at the overlapping portions of the foregoing, and to increase the joining strength of the panels 5, 6 with each other.

Figure 6:
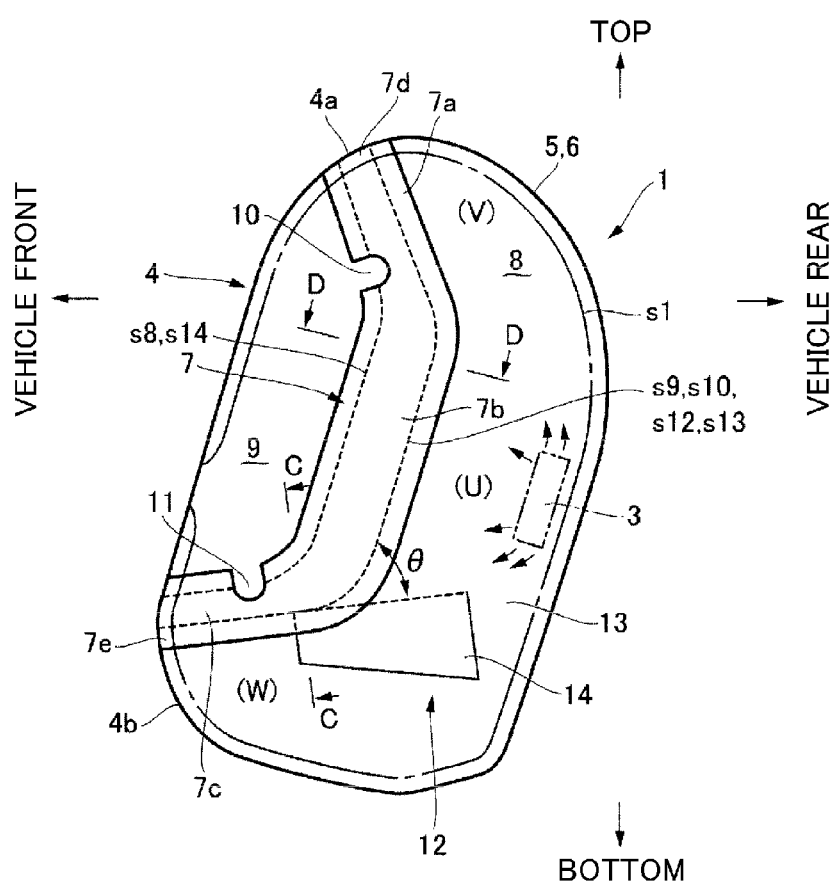
FIG. 6 is a side-view diagram of a state resulting from removing one panel, illustrating a second variation of the vehicular side airbag device depicted in FIG. 1.
Figure 7:
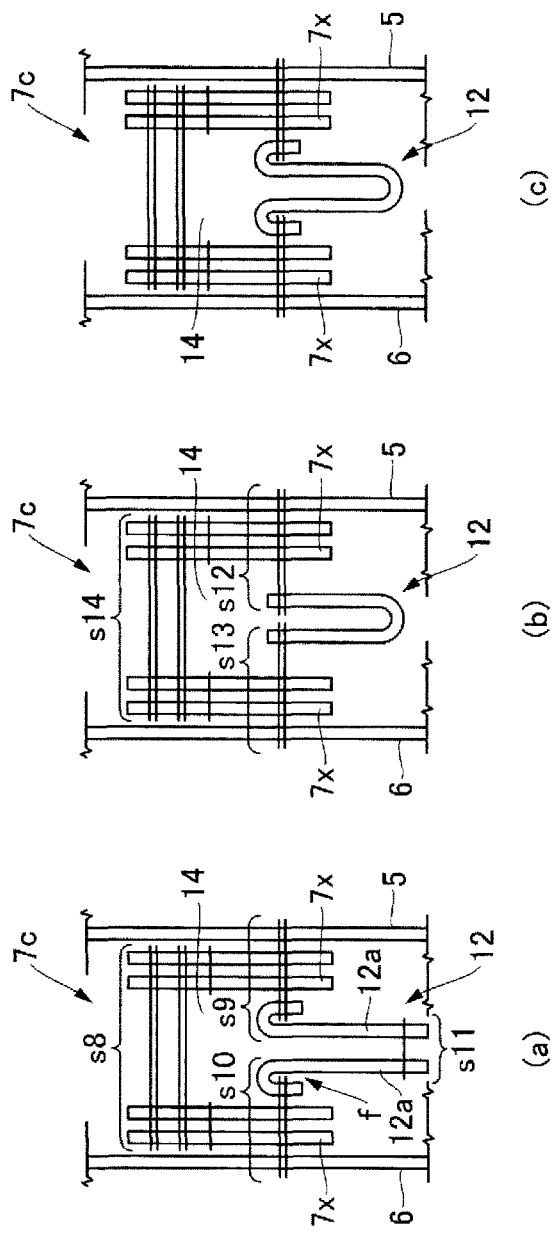
FIG. 7 (a,b,c) is an explanatory diagram illustrating various examples of cross-sections taken along a C-C view line of FIG. 6.

FIG. 6 and FIG. 7(a,b,c) illustrate a second variation. FIG. 6 is a side-view diagram of a state resulting from removing one of the panels of the vehicular side airbag device, and FIG. 7 is an explanatory diagram illustrating various examples of cross-sections taken along a C-C view line in FIG. 6. FIG. 6 illustrates the side airbag 4 prior to being folded. This second variation is substantially identical to the first variation, except for the configuration of the partitioning member 7.

The partitioning member 7 in the second variation is formed similarly to the partitioning member 7 of the first variation, through joining of one respective side edge of two superimposed band-like members 7x. This partitioning member 7 as well can be used as a concrete example of the first embodiment.

FIG. 7a illustrates a first example of the supplementary partitioning member 12 of the second variation. The supplementary partitioning member 12 is configured in the same way as in the case of FIG. 5B. In this example as well, the partitioning member 7 is set to have a double ply.

In an explanation of the foregoing according to the fabrication procedure of the side airbag 4, first side edges of the band-like members 7x are joined to each other, to produce firstly the partitioning member 7 (s8). Next, one side edge of one of the strips 12a, one side edge of one of the band-like members 7x of the partitioning member 7, and one of the panels, herein the panel 5, are superimposed on each other and are joined (s9). One side edge of each strip 12a that is joined to the partitioning member 7 is folded back towards the partitioning member 7, and the whole is joined.

Next, one side edge of the other strip 12a, having been folded back, the other side edge of the other the band-like member 7x of the partitioning member 7, and the other panel 6, are superimposed so that the supplementary partitioning member 12 is sandwiched therebetween, and are joined, leaving a fold-back f of one side edge of the strips 12a as a joining margin. The two side edges of the partitioning member are joined to the panels, over the entire length of the partitioning member (s10). Next, the other side edges of the two strips 12a are superimposed and joined (s11), to produce the supplementary partitioning member 12. Lastly, the panels are joined by the outer peripheral edge seam line s1 of the side airbag 4.

The hollow cylindrical duct 14 becomes formed as a result between the supplementary partitioning member 12 made up of the two strips 12a, and the partitioning member 7 made up of the two band-like members 7x.

FIG. 7b illustrates a second example. In the supplementary partitioning member 12 of the second example, one single strip is used half-folded in the width direction. In the second example, the two band-like members 7x of the partitioning member 7 are joined to each other later on.

Firstly, one side edge of the supplementary partitioning member 12, one side edge of one of the band-like members 7x and one of the panels, namely the panel 5, are superimposed and joined (s12). Thereafter, the other side edge of the supplementary partitioning member 12, the other side edge of the other band-like member 7x, and the other panel 6 are superimposed and joined (s13). Thereafter, the other side edges of the band-like members 7x are joined to each other (s14), to form the partitioning member 7. Lastly, the panels are joined by the outer peripheral edge seam line s1 of the side airbag 4.

FIG. 7c illustrates a third example. In the third example there may be used the fabrication procedure of either the first example of FIG. 7A, in which the band-like members 7x of the partitioning member 7 are joined to each other first, or of the second example of FIG. 7B, where the band-like members 7x are joined to each other later on. The supplementary partitioning member 12 having the duct 14 can be built into the side airbag 4, as described above.

The first and the second variation elicit, as a matter of course, the same effect afforded by the first embodiment.

Figure 8:
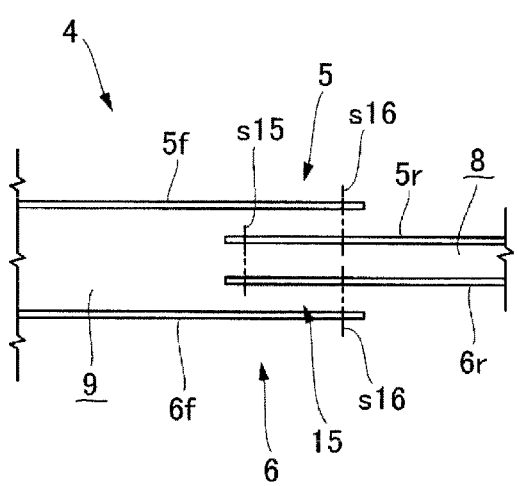
FIG. 8 is a cross-sectional diagram, corresponding to a view taken along a D-D view line of FIG. 6, illustrating a third variation of the vehicular side airbag device depicted in FIG. 1.

FIG. 8 illustrates a third variation in which a partition is formed without using separate partitioning member. FIG. 8 corresponds to a cross-section taken along a D-D view line of FIG. 6.

The cabin-side and vehicle exterior-side panels 5, 6 are formed being divided into vehicle-rear side panel sections 5r, 6r, from the rear end of the side airbag 4, taking as a guideline of the front end side the vicinity of the seam lines s8, s14 of the band-like members 7x of the partitioning member 7, and into vehicle-front side panel sections 5f, 6f, from the front end of the side airbag 4, taking as a guideline of the rear end side both side edges of the partitioning member 7 and the vicinity of seam lines s9, s10, s12, s13 of the panels 5, 6.

The vehicle-rear side panel sections 5r, 6r of the cabin-side and vehicle exterior-side panels 5, 6 are joined at the front end positions of the foregoing (corresponding to the mutual seam lines s8, s14 of the band-like members) (s15). Next, the vehicle-front side panel sections 5f, 6f are superimposed on each other, outward of the vehicle-rear side panel sections 5r, 6r having been joined. Next, the vehicle-front side panel sections 5f, 6f are joined to the superimposed adjacent vehicle rear panel sections 5r, 6r (see interfaces at seam lines s16).

By doing so, it becomes possible without using a partitioning member to provide a partition 15 that divides the interior of the side airbag 4 into two chambers, namely the rapid chamber 8 and the delay chamber 9. In a case where the half-folded partitioning member 7 illustrated in FIG. 4 is replaced by the partition 15, a two-chamber or pseudo-three-chamber side airbag 4 can be configured in which no partitioning member is used, by producing the vehicle-rear side panel sections 5r, 6r half-folded.

Figure 9:
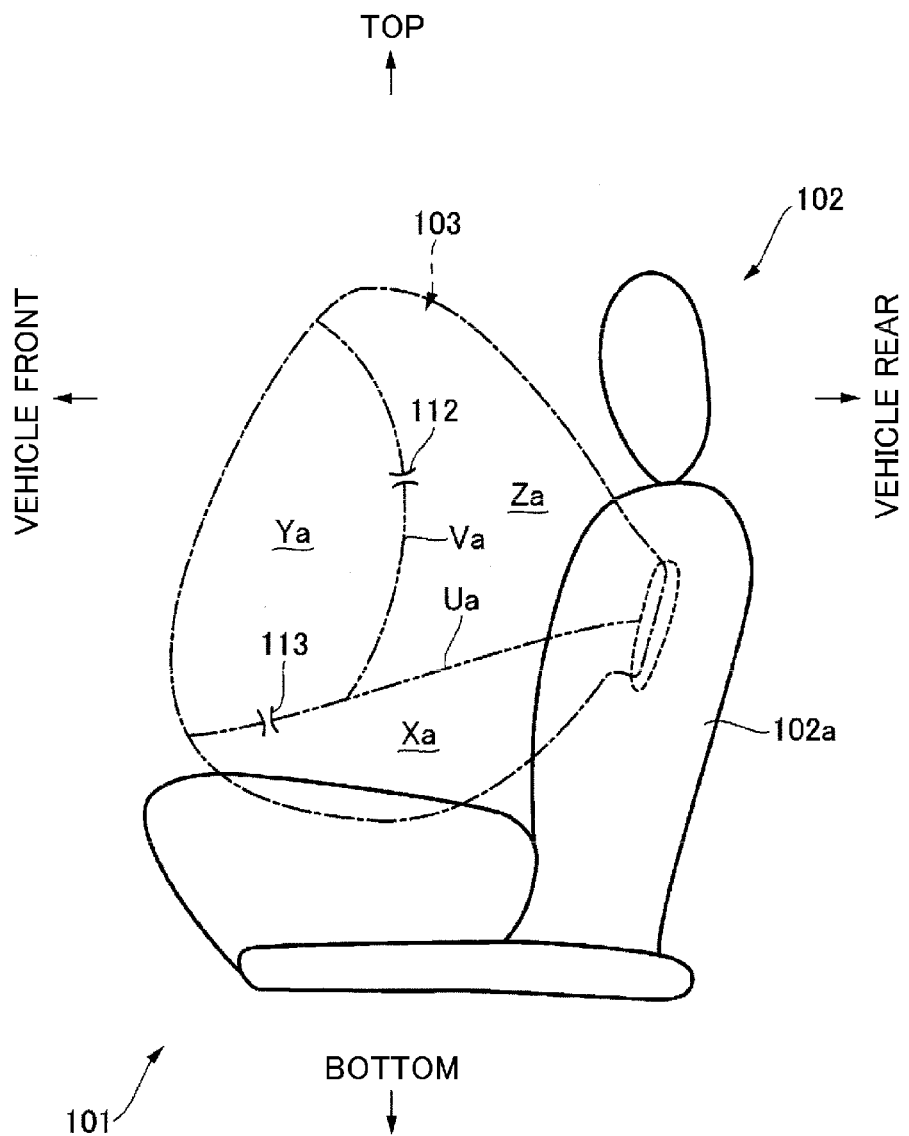
FIG. 9 is a side-view diagram illustrating a second embodiment of the vehicular side airbag device according to the present invention.

A second embodiment of the vehicular side airbag device according to the present invention will be explained next in detail with reference to accompanying drawings. FIG. 9 illustrates schematically a vehicular side airbag device 101 according to the present embodiment. The vehicular side airbag device 101 comprises a side airbag 103 that is built into a seat back 102a of a seat 102, and that deploys and inflates, by the action of an inflator gas that is introduced from an inflator, from a vehicle rear towards a vehicle front, between an occupant and a vehicle side section.

In the second embodiment explained below, the interior of the side airbag 103 is divided into three regions by a top-bottom partitioning section Ua and a front-rear partitioning section Va. The three regions are a lower bag region Xa, an upper rear bag region Za, and an upper front bag region Ya. The lower bag region Xa and the upper rear bag region Za form the rapid chamber 8 of the first embodiment, and the upper front bag region Ya forms the delay chamber 9 of the first embodiment. In the second embodiment, in other words, the rapid chamber 8 is divided into two regions, i.e. the lower bag region Xa and the upper rear bag region Za.

Regarding the top-bottom partitioning section Ua and the front-rear partitioning section Va, the top-bottom partitioning section (supplementary partitioning member 12) is formed, in the first embodiment, from the front-rear partitioning section (partitioning member 7), in the vehicle front-rear direction. In the second embodiment, by contrast, the front-rear partitioning section Va is formed from the top-bottom partitioning section Ua, in the vehicle top-bottom direction. The first embodiment and the second embodiment share the feature of forming the lower bag region Xa, the upper rear bag region Za and the upper front bag region Ya inside the side airbag 103.

As disclosed in Japanese Patent Application Publication No. 2000-108835, the interior of a side airbag configured mainly out of panels has been divided so far into a plurality of chambers (regions). If a plurality of chambers can be provided, for instance the waist, shoulder, chest and so forth of the occupant can be properly caught by the respective chambers, such that occupant protection performance can be enhanced, by making the internal pressure of the chambers adjustable as appropriate.

However, when a tether or a separation wall are used as additional components upon formation of a plurality of chambers, the joints between the separation walls and so forth and the panels are intricate, and production of the side airbag itself becomes complex. Further, it is difficult to secure high strength in the joints, and, accordingly, it has been very hard to realize a side airbag provided with a plurality of chambers.

It would be desirable to devise a vehicular side airbag device in which occupant protection performance can be enhanced, by making it possible to obtain a side airbag that is provided with three regions, using basically only panels that make up the outline of the side airbag.

Figure 10:
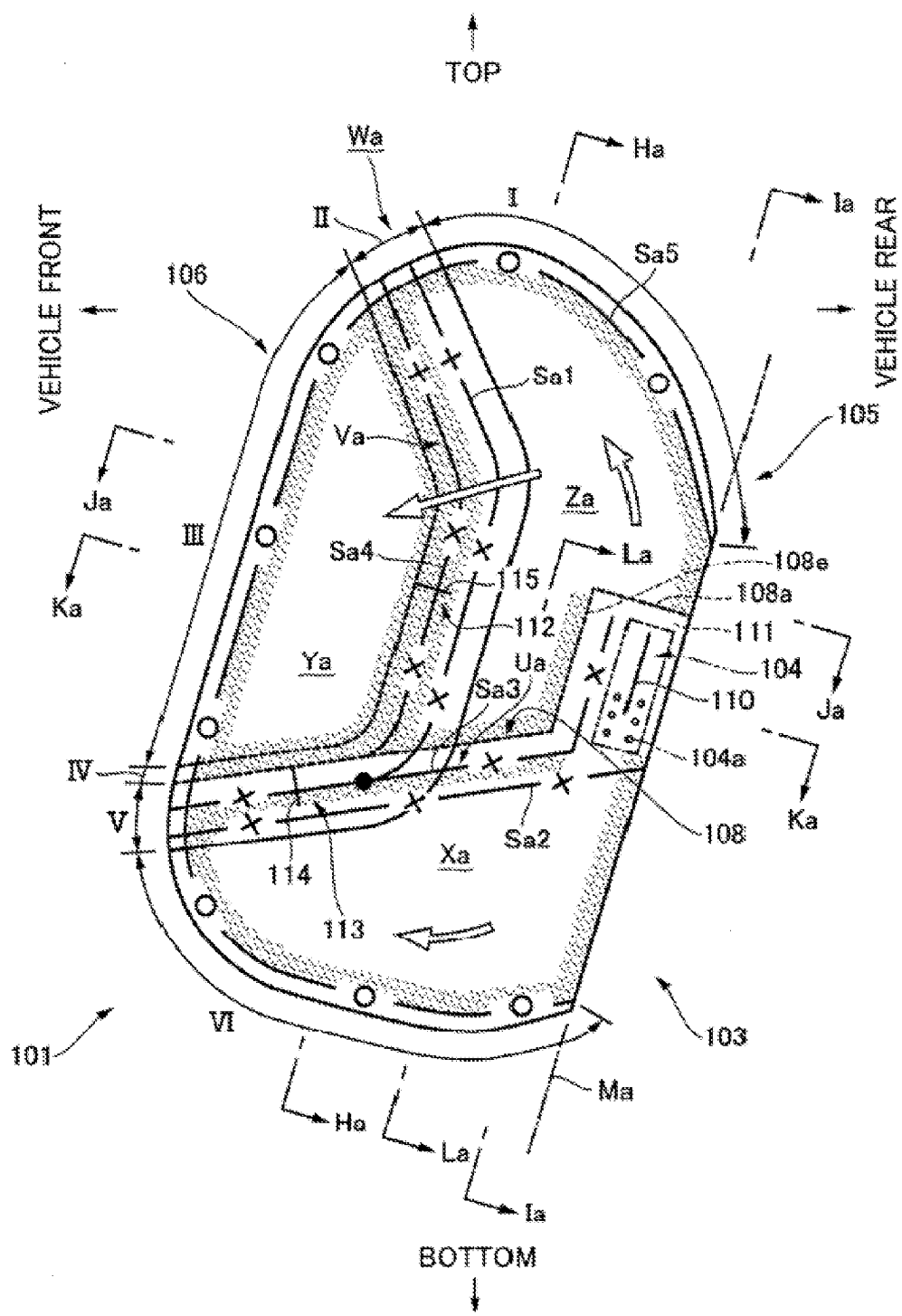
FIG. 10 is a side-view diagram illustrating a side airbag used in the vehicular side airbag device of FIG. 9.

FIG. 10 is a side-view diagram of the vehicular side airbag device 101 according to the second embodiment. The vehicular side airbag device 101 is mainly configured by comprising the side airbag 103 and the inflator 104. The configuration of the side airbag 103 will be explained next according to the fabrication procedure of the side airbag 103.

Figure 11:
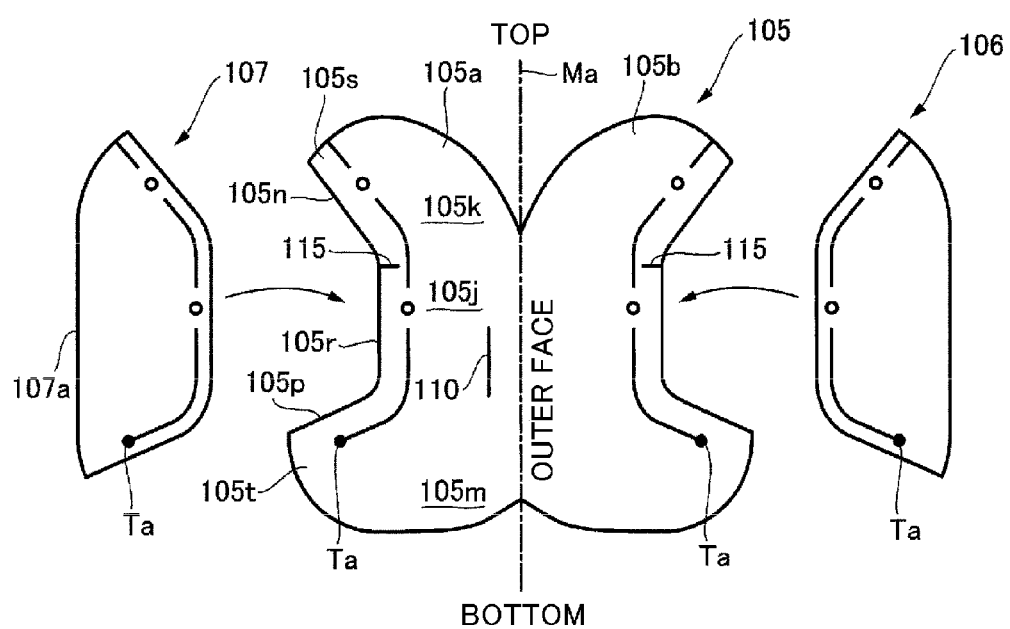
FIG. 11 is an explanatory diagram of a first step of producing the side airbag depicted in FIG. 10.
Figure 12:
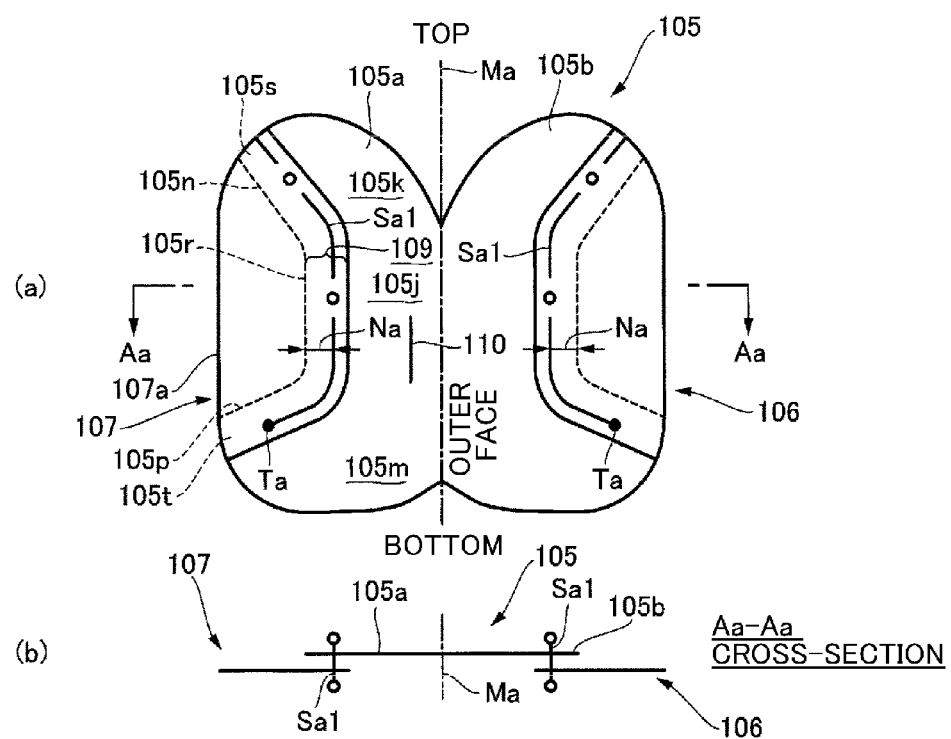
FIG. 12 (a,b) is a set of explanatory diagrams of a second step of producing the side airbag depicted in FIG. 10, where

The side airbag 103 used in the present embodiment is made up of four panels 105 to 108 illustrated in FIG. 11 to FIG. 14. A first panel 105 is made up of an exterior-side panel 105*a* and an interior-side panel 105*b*, as illustrated in FIG. 11 and FIG. 12. When the side airbag 103 is deployed, the exterior-side panel 105*a* faces the vehicle side section L, for instance a door inner face or side window inner face. When the side airbag 103 is deployed, the interior-side panel 105*b* faces the occupant. In the examples illustrated in the figures, the interior-side panel 105*b* and the exterior-side panel 105*a* are formed integrally.

A fold line Ma is set at the boundary (seam) of the interior-side panel 105*b* and the exterior-side panel 105*a*. Mounting of the side airbag 103 is set in such a manner that when the side airbag 103 is built in the seat back 102*a*, the position of the fold line Ma is on the vehicle-rear side, and the side opposite the fold line Ma is on the vehicle-front side. The interior-side panel 105*b* and the exterior-side panel 105*a* are formed to be line-symmetrical with respect to the fold line Ma. The interior-side panel 105*b* and the exterior-side panel 105*a* are superimposed on each other exactly through folding along the fold line Ma. The interior-side panel 105*b* and the exterior-side panel 105*a* may be formed separately, and then joined integrally at the boundary position.

In an explanation of the exterior-side panel 105*a*, a central portion 105*j* of the panel 105*a*, in the top-bottom direction, has a band-like form of substantially constant width. An upper portion 105*k* and a lower portion 105*m* of the exterior-side panel 105*a* are formed to a shape thrusting from the central portion 105*j* towards the vehicle front. A lower edge 105*n* of the upper portion 105*k* is formed inclined downward towards the vehicle rear, whereas an upper edge 105*p* of the lower portion 105*m* is formed inclined upward towards the vehicle rear. Accordingly, the exterior-side panel 105*a* has formed therein a C-(or C-shaped) recess 105*r* that widens gradually.

The fold line Ma is set over a stretch extending from the upper portion 105*k* up to the lower portion 105*m*, across the central portion 105*j*. The interior-side panel 105*b* is formed to have an inverse shape to that of the exterior-side panel 105*a* with respect to fold line Ma.

The second panel is a complementary exterior-side panel 107 that is joined to the outer face of the exterior-side panel 105*a*, as illustrated in FIG. 11 and FIG. 12. The third panel is a complementary interior-side panel 106 that is joined to the outer face of the outer face of the interior-side panel 105*b*.

In an explanation of the complementary exterior-side panel 107, the latter is formed to a size so as to cover up the recess 105*r*, when the panel 107 is overlaid on the outer side of the exterior-side panel 105*a*. The outline of the complementary exterior-side panel 107 is formed so as to follow the recess 105*r* of the exterior-side panel 105*a*. The end edge 107*a* on the vehicle-front side is formed so as to smoothly connect vehicle-front side tips 105*s*, 105*t* of the upper portion 105*k* and the lower portion 105*m* of the exterior-side panel 105*a*.

When an end edge 107*a* of the complementary exterior-side panel 107, on the vehicle-front side, is superimposed aligned with the contours of the upper portion 105*k* and the lower portion 105*m* of the exterior-side panel 105*a*, the exterior-side panel 105*a* and the complementary exterior-side panel 107 overlap along the recess 105*r*, as illustrated in FIG. 12(*a,b*). The complementary exterior-side panel 107 is positioned outward of an overlap site 109, and the exterior-side panel 105*a* is positioned inward.

At the overlap site 109, the complementary exterior-side panel 107 is joined to the exterior-side panel 105*a* by a first joint Sa1. The complementary exterior-side panel 107 is joined by the first joint Sa1, leaving a joining margin Na along the recess 105*r*, to the exterior-side panel 105*a*, on the vehicle-rear side of the joining margin Na. A starting point or end point T of the first joint Sa1 at the overlap site 109 is set to an appropriate position below the upper edge 105*p* of the lower portion 105*m*. The first joint Sa1 at the overlap site 109 is set from the starting point or end point T up to the upper edge of the upper portion 105*k*. The complementary exterior-side panel 107 becomes joined thereby to the outer face of the exterior-side panel 105*a*.

The same applies to joining of the interior-side panel 106 and the complementary interior-side panel 105*b*. FIG. 12*b* is a cross-sectional diagram taken along an Aa-Aa view line of FIG. 12*a*, wherein the first joint Sa1 that joins the complementary exterior-side panel 107 and the complementary interior-side panel 106 appears on both sides of the integral exterior-side panel 105*a* and interior-side panel 105*b*.

Figure 13:
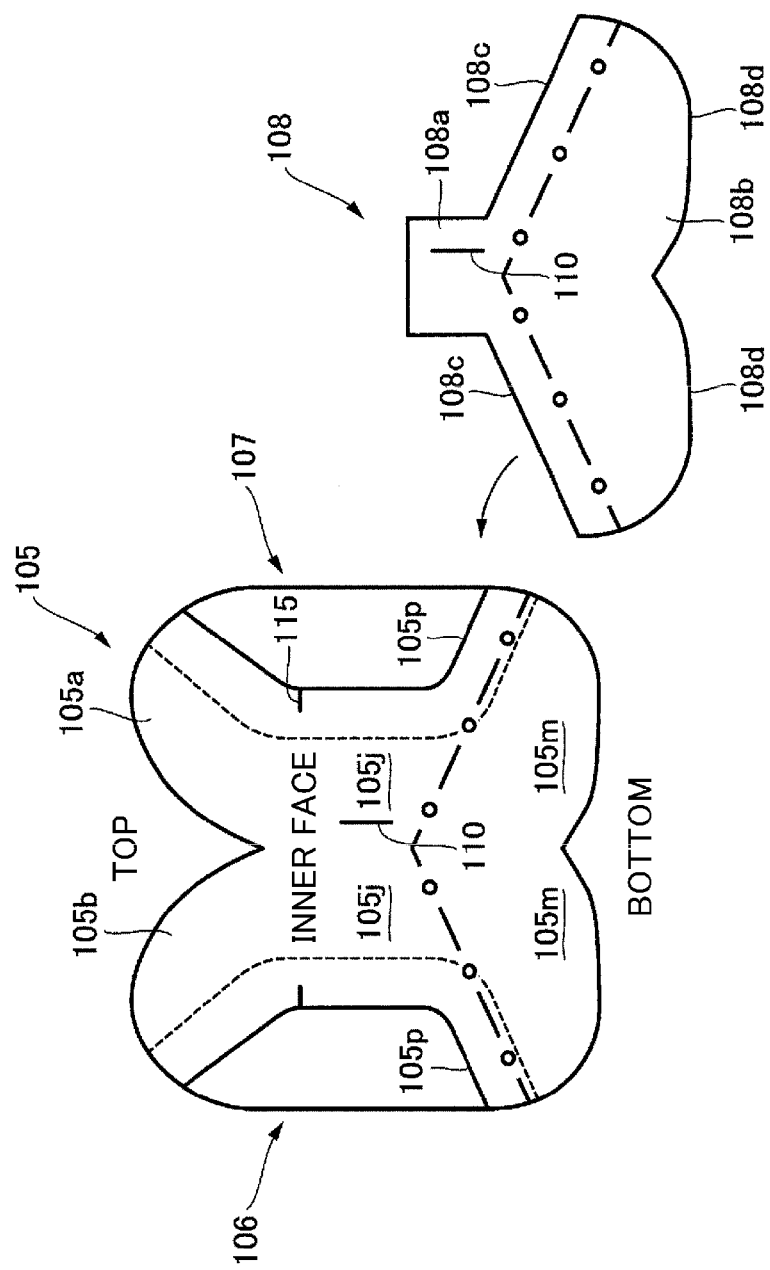
FIG. 13 is an explanatory diagram of a third step of producing the side airbag depicted in FIG. 10.
Figure 14:
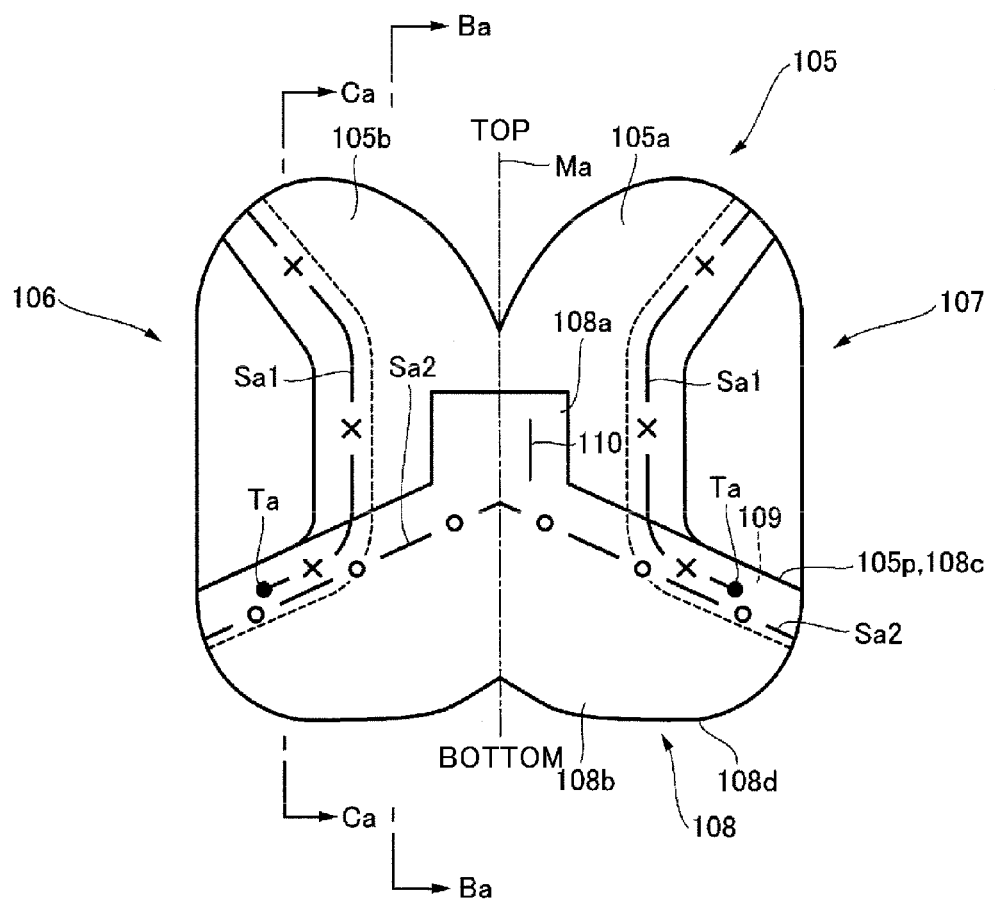
FIG. 14 is an explanatory diagram of a fourth step of producing the side airbag depicted in FIG. 10.

As illustrated in FIG. 13 and FIG. 14, the fourth panel is an additional panel 108 that is joined to the inner faces of the integral exterior-side panel 105*a* and interior-side panel 105*b*. The additional panel 108 comprises a band-like upward protrusion 108*a* of substantially constant width, and an extension 108*b*, formed to have substantially a fan shape that spreads to the left and right, below the upward protrusion 108*a*. The extension 108*b* adopts substantially a form that is enclosed by upper edge sections 108*c* that extend, leftward and rightward, from the lower end of the upward protrusion 108*a*, and by lower edge sections 108*d* that connect the left and right ends of the upper edge sections 108*c*.

The additional panel 108 is formed to have an outline that approximately overlaps the lower portion 105*m* exactly, when the additional panel 108 is superimposed on the inner faces of the exterior-side panel 105*a* and the interior-side panel 105*b*. Although the additional panel 108 is a single panel, it is formed to be line-symmetrical with respect to the fold line Ma. As a result, the additional panel 108 can be superimposed exactly on itself through folding at the fold line Ma. The portion of the additional panel 108 that overlaps the interior-side panel 105*b* and the portion that overlaps the exterior-side panel 105*a* may be formed separately, and be then joined integrally at a boundary position.

The lower edge sections 108*d* of the additional panel 108 overlap the lower edges of the interior-side panel 105*b* and the lower portion 105*m* of the exterior-side panel 105*a*. The upper edge sections 108*c* of the additional panel 108 overlap the upper edges 105*p* of the lower portion 105*m* of the interior-side panel 105*b* and the exterior-side panel 105*a*. The upper edge sections 108*c* extend obliquely upward and towards the vehicle rear, crossing the central portion 105*j* towards the upward protrusion 108*a* (fold line Ma).

The upper edge sections 108*c* of the additional panel 108 overlap the complementary interior-side panel 106 or the complementary exterior-side panel 107 as well, sandwiching the interior-side panel 105*b* or the exterior-side panel 105*a*. Upon folding of the upward protrusion 108*a* of the additional panel 108 along the fold line Ma, the upward protrusion 108*a* is folded back, in a half-fold, between the central portions 105*j* of the exterior-side panel 105*a* and the interior-side panel 105*b*, at a vehicle rear position.

The additional panel 108 is joined to the exterior-side panel 105*a* and the interior-side panel 105*b* by a second joint Sa2. In an explanation of joining of the additional panel 108 to the exterior-side panel 105*a*, the second joint Sa2 is formed along the upper edge sections 108*c* of the additional panel 108 (upper edge 105*p* of the lower portion 105*m* of the exterior-side panel 105*a*) in such a way so as to reach the fold line Ma, from the vehicle-front side tip of the lower portion 105*m* of the exterior-side panel 105*a*. The second joint Sa2 is set to stand below the starting point or end point T of the first joint Sa1 of the overlap site 109. Joining of the additional panel 108 and the interior-side panel 105*b* is identical.

Figure 15:
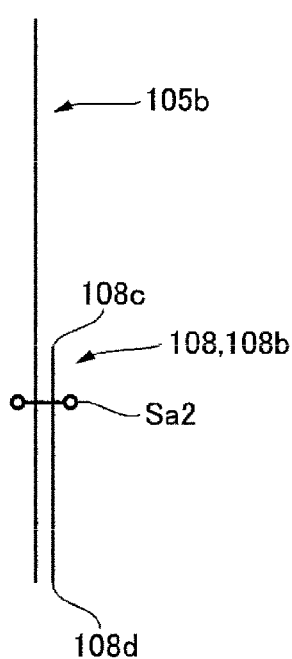
FIG. 15a is a cross-sectional diagram taken along a Ba-Ba view line of FIG. 14.
FIG. 15b is a cross-sectional diagram taken along a Ca-Ca view line of FIG. 14.
Figure 15:
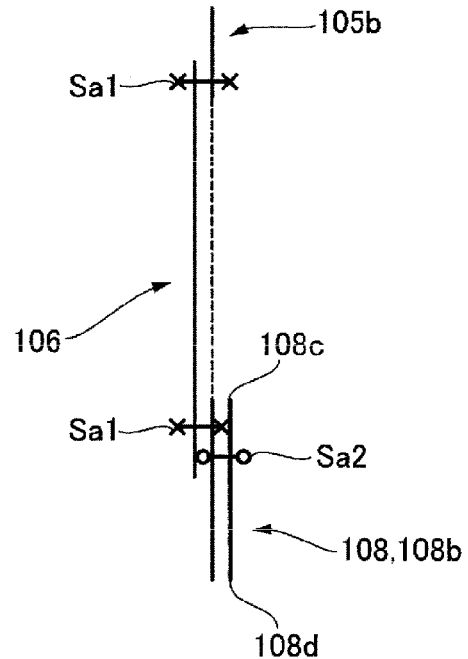

The additional panel 108 becomes joined as a result joined to the exterior-side panel 105*a* and the interior-side panel 105*b* by the second joint Sa2. FIG. 15*a* is a cross-sectional diagram taken along a Ba-Ba view line of FIG. 14, wherein the second joint Sa2 that joins the additional panel 108 of the exterior-side panel 105*a* and the interior-side panel 105*b* appears on the vehicle-rear side, without superimposed complementary panels 106, 107.

FIG. 15*b* is a cross-sectional diagram taken along a Ca-Ca view line of FIG. 14, wherein the second joint Sa2 that joins the exterior-side panel 105*a* and the interior-side panel 105*b* to the additional panel 108 appears below the first joint Sa1 that joins the complementary exterior-side panel 107 and the complementary interior-side panel 106 to the exterior-side panel 105*a* and the interior-side panel 105*b*, at the above cross-section position. The first joint Sa1 appears again above the first joint Sa1 that stands directly above the second joint Sa2.

A cut 110 for insertion of the inflator 104 is formed, at the position of the upward protrusion 108*a*, in the exterior-side panel 105*a* or interior-side panel 105*b* and in the additional panel 108.

Figure 16:
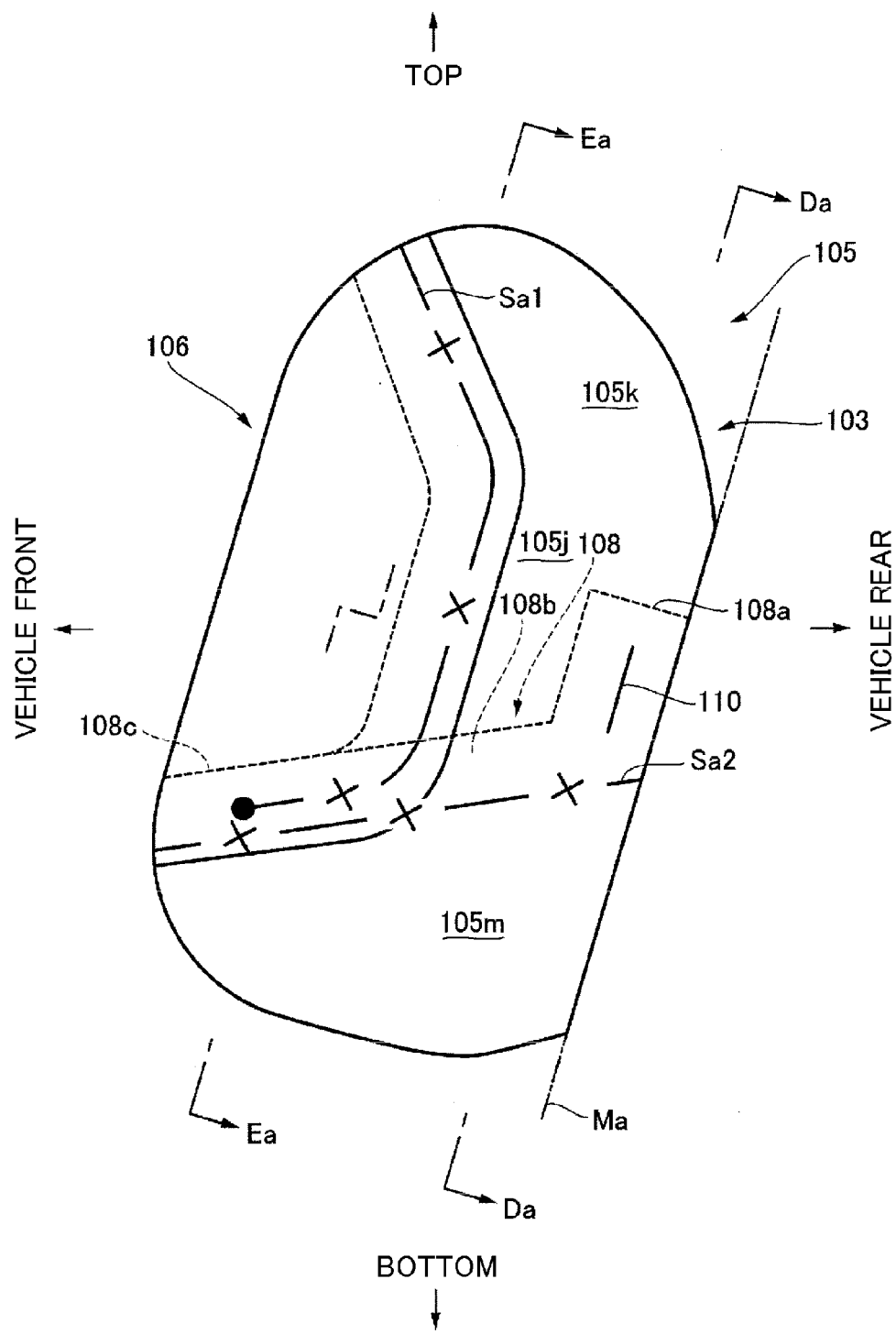
FIG. 16 is an explanatory diagram of a fifth step of producing the side airbag depicted in FIG. 10.
Figure 17:
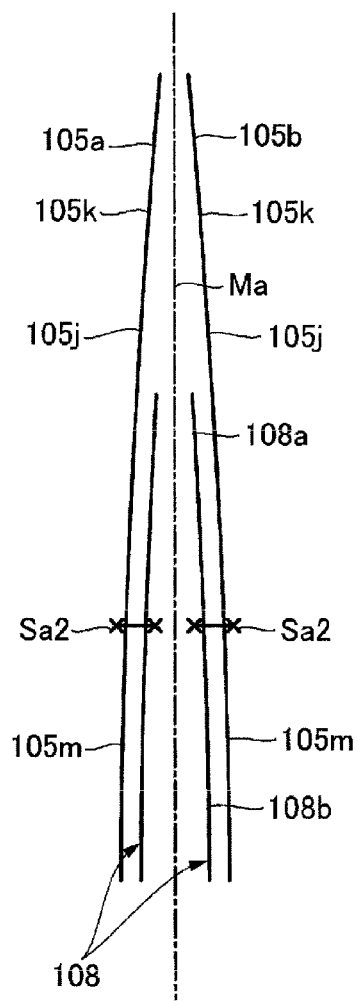
FIG. 17a is a cross-sectional diagram taken along a Da-Da view line of FIG. 16.
FIG. 17b is a cross-sectional diagram taken along an Ea-Ea view line of FIG. 16.
Figure 17:
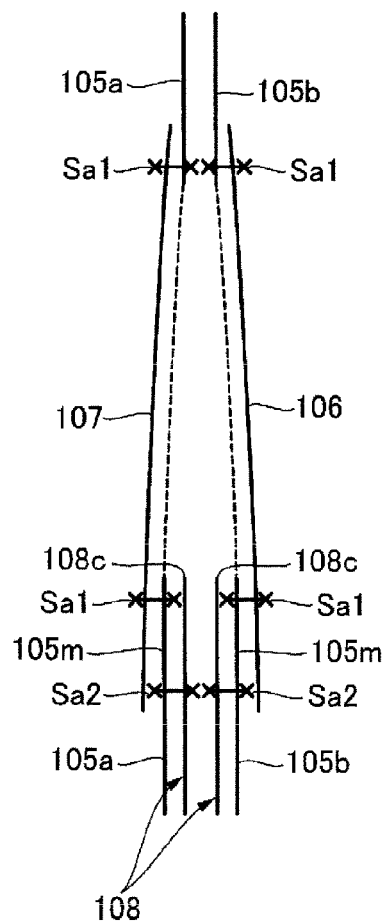

FIG. 16 illustrates the manner in which the side airbag 103 made up of the four panels 105 to 108 illustrated in FIG. 14, and being in a deployed state, is folded back along the fold line Ma. FIG. 17*a* is a cross-sectional diagram taken along a Da-Da view line of FIG. 16, and FIG. 17*b* is a cross-sectional diagram taken along an Ea-Ea view line of FIG. 16.

The first joint Sa1 and the second joint Sa2 are depicted in pairs. In a folded-back state, the central portions 105*j* and the upper portions 105*k* of the exterior-side panel 105*a* and of the interior-side panel 105*b* respectively oppose each other in the vicinity of the fold line Ma, on the vehicle-rear side of the side airbag 103, as illustrated in FIG. 17*a*. In the vicinity of the fold line Ma, the folded-back additional panel 108 adopts an overlapping double structure, sandwiched between respective lower portions 105*m* of the exterior-side panel 105*a* and the interior-side panel 105*b*. Further, the upward protrusion 108*a* of the additional panel 108 communicates with the upper portions 105*k* of the exterior-side panel 105*a* and the interior-side panel 105*b*, between the mutually opposing sections of the additional panel 108 at the lower portions 105*m*.

As illustrated in FIG. 17*b*, the complementary exterior-side panel 107 and the complementary interior-side panel 106 oppose each other, on the vehicle-front side of the side airbag 103, and the lower portions 105*m* of the exterior-side panel 105*a* and the interior-side panel 105*b* oppose each other across the additional panel 108.

Figure 18:
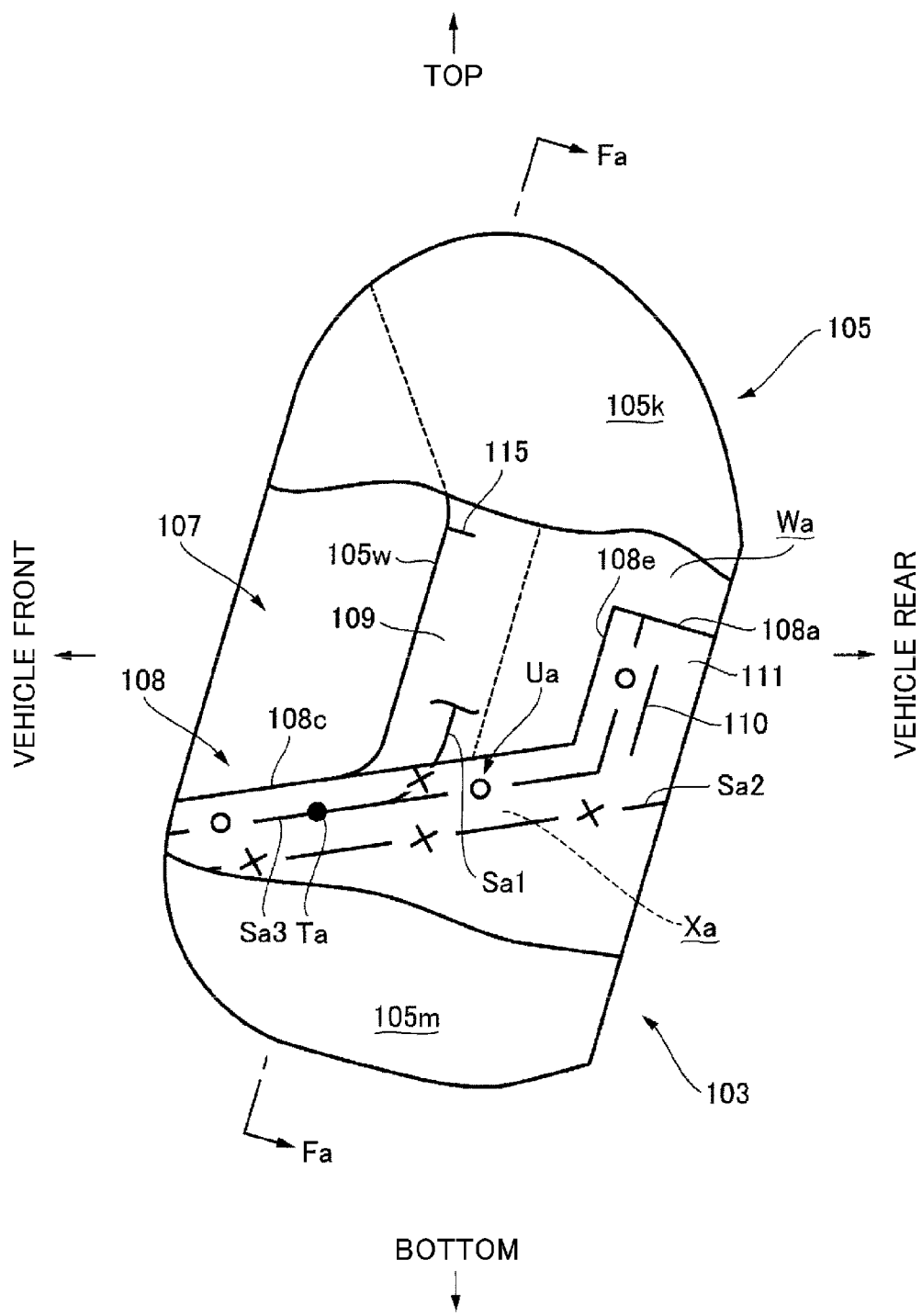
FIG. 18 is an explanatory diagram of a sixth step of producing the side airbag depicted in FIG. 10.

FIG. 18 is a partial cutaway side-view diagram illustrating the manner in which a third joint Sa3 that constitutes the top-bottom partitioning section U is formed inside the side airbag 103. The top-bottom partitioning section U is a baffle that divides the interior of the side airbag 103 into the lower bag region X and an upper bag region W. The top-bottom partitioning section U (third joint Sa3) is formed, in the vehicle front-rear direction, inside the side airbag 103. The third joint Sa3 joins together the upper edge sections 108*c* of the additional panel 108 that face each other through folding back of the additional panel 108.

The third joint Sa3 joins to each other, parallelly to the fold line Ma, front edge sections 108*e* that are positioned on the vehicle-front side, at the position of the upward protrusion 108*a*. As a result, the upward protrusion 108*a* is formed to a cylindrical shape; herein, the cylindrical upward protrusion 108*a* connects the upper portions 105*k* of the exterior-side panel 105*a* and of the interior-side panel 105*b* with the lower portions 105*m* at which the additional panel 108 is positioned. The cylindrical upward protrusion 108*a* constitutes an inflator mounting duct 111 in which the inflator 104 is mounted. The cut 110 is positioned in the inflator mounting duct 111.

The third joint Sa3 joins together only the additional panel 108 in such a way so as to pass the position of the starting point or end point T of the first joint Sa1 that joins the overlap site 109.

Figure 19:
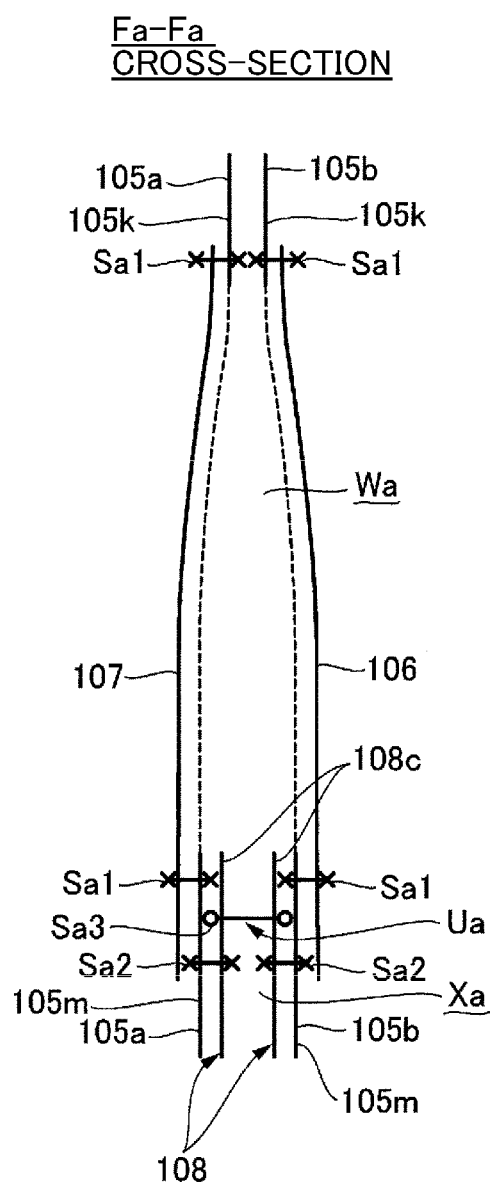
FIG. 19 is a cross-sectional diagram taken along an Fa-Fa view line of FIG. 18.

FIG. 19 is a cross-sectional diagram taken along an Fa-Fa view line of FIG. 18. In the above cross-section position, the third joint Sa3 appears above the second joint Sa2 that joins the additional panel 108 to the exterior-side panel 105*a* and the interior-side panel 105*b*, while the first joint Sa1 that joins the complementary panels 106, 107 to the exterior-side panel 105*a* and the interior-side panel 105*b* appears above the third joint Sa3. The first joint Sa1 appears again further above the first joint Sa1.

The exterior-side panel 105*a* and the interior-side panel 105*b* are first joined by the third joint Sa3 indirectly via the additional panel 108. At this stage, the side airbag 103 is in a state where the additional panel 108 overlaps itself, in a double structure, with the third joint Sa3, which constitutes the top-bottom partitioning section U, as a boundary, such that the lower portions 105*m* of the exterior-side panel 105*a* and the interior-side panel 105*b* can be spread downward, and being a state where the central portions 105*j* and the upper portions 105*k* of the exterior-side panel 105*a* and the interior-side panel 105*b*, which join the complementary panels 106, 107, can be spread upward.

The third joint Sa3 passes the starting point or end point T of the first joint Sa1. Therefore, the first joint Sa1 and the third joint Sa3 do not intersect, and joints can thus be prevented from intertwining in a complex manner. Thanks to this absence of intertwining joints, the first joint Sa1 and the third joint Sa3 can be formed firmly and strongly, and it becomes possible to secure high strength at peripheral portions of the first joint Sa1 and the third joint Sa3. A joining margin required for the first joint Sa1 and the third joint Sa3, to secure the periphery of the top-bottom partitioning section U, can be kept to the minimum necessary, and the side airbag 103 can be made thus more compact.

Figure 20:
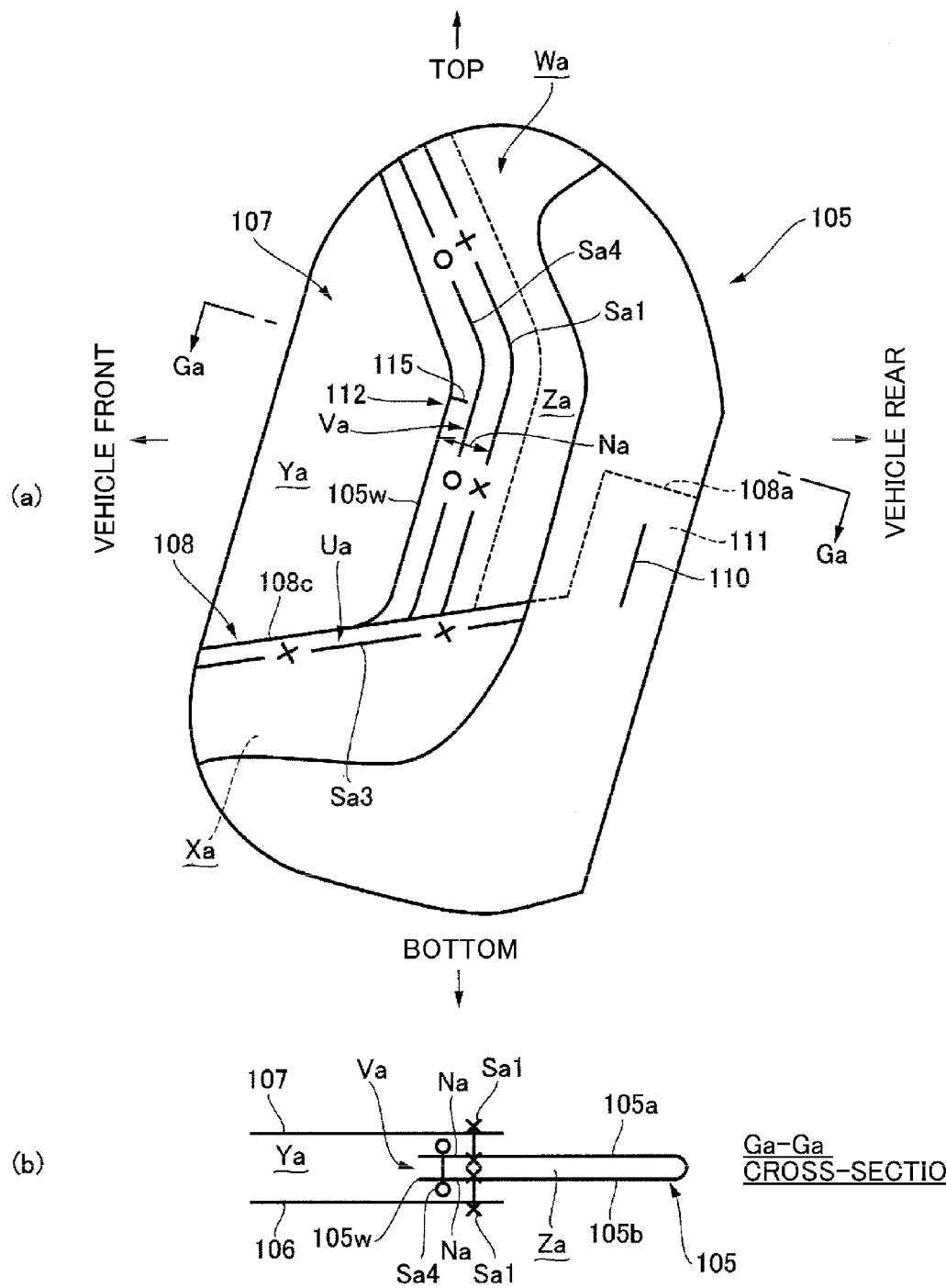
FIG. 20(a,b) is a set of explanatory diagrams of a seventh step of producing the side airbag depicted in FIG. 10, where

FIG. 20(*a*,*b*) illustrates the manner in which a fourth joint Sa4 that constitutes the front-rear partitioning section V is formed inside the side airbag 103.

The front-rear partitioning section V is formed from the top-bottom partitioning section U towards the top of the vehicle. The front-rear partitioning section V is a baffle that divides the upper bag region W, inside the side airbag 103, into the upper front bag region Y and the upper rear bag region Z.

The fourth joint Sa4 joins the exterior-side panel 105*a* and the interior-side panel 105*b* leaving a joining margin Na, closer to the vehicle front than the first joint Sa1, at the overlap site 109 of the exterior-side panel 105*a* and the complementary exterior-side panel 107, and at the overlap site 109 of the interior-side panel 105*b* and the complementary interior-side panel 106. The fourth joint Sa4 is formed so as to reach up to the upper edge section of the exterior-side panel 105*a* and the interior-side panel 105*b*, from directly above the third joint Sa3 of the additional panel 108.

FIG. 20*a* is a partial cutaway side-view diagram, and FIG. 20B is a cross-sectional diagram taken along a Ga-Ga view line of FIG. 20*a*, wherein the fourth joint Sa4 appears between the complementary panels 106, 107, closer to the vehicle front than the first joint Sa1. The exterior-side panel 105*a* and the interior-side panel 105*b* are directly joined first by the fourth joint Sa4. A front-rear direction vent 112 is formed in the joining margin Na that forms the fourth joint Sa4, at an appropriate position in the top-bottom direction.

The front-rear direction vent 112 is a slit 115 that intersects the fourth joint Sa4. The front-rear direction vent 112, which can be opened and closed, enables communication of the upper rear bag region Z with the upper front bag region Y.

Lastly, a fifth joint Sa5 is formed that goes around the vehicle-front side, from the top end of the fold line Ma, to reach the lower end of the fold line Ma, as illustrated in FIG. 10.

In FIG. 10, the fifth joint Sa5 joins the two superimposed panels of the exterior-side panel 105a and the interior-side panel 105b, at region (I); joins the four superimposed panels of the exterior-side panel 105a, the interior-side panel 105b, the complementary interior-side panel 106 and the complementary interior-side panel 107, at region (II); joins together the two superimposed panels of the complementary panels 106, 107, at region (III); joins the four superimposed panels of the exterior-side panel 105a, the interior-side panel 105b, the complementary interior-side panel 106, and the complementary interior-side panel 107, at region (IV); joins the six superimposed panels of the overlapping additional panel 108 and the exterior-side panel 105a, the interior-side panel 105b, the complementary interior-side panel 106 and the complementary interior-side panel 107, at region (V); and joins the four superimposed panels of the overlapping additional panel 108 and the exterior-side panel 105a and the interior-side panel 105b, at region (VI).

As a result, the peripheral edge of the side airbag 103 is sealed off, and simultaneously therewith, the lower bag region X, the upper rear bag region Z and the upper front bag region Y are delimited, to complete thereby the side airbag 103.

The inflator 104 is fixed to the seat back 102a. The inflator 104 is inserted, through the cut 110, into the inflator mounting duct 111 inside the side airbag 103. The side airbag 103 in a folded state is stored inside the seat back 102a, and is attached to and supported on the seat back 102a, via the inflator 104. The inflator mounting duct 111 is formed from the lower bag region X over the upper rear bag region Z.

The inflator 104 that is inserted into the inflator mounting duct 111 is disposed from the upper rear bag region Z over the lower bag region X, on the vehicle-rear side of the interior of the side airbag 103. A gas jetting hole 104a of the inflator 104 that jets an inflator gas is set, inside the inflator mounting duct 111, on the lower bag region X-side.

Figure 21:
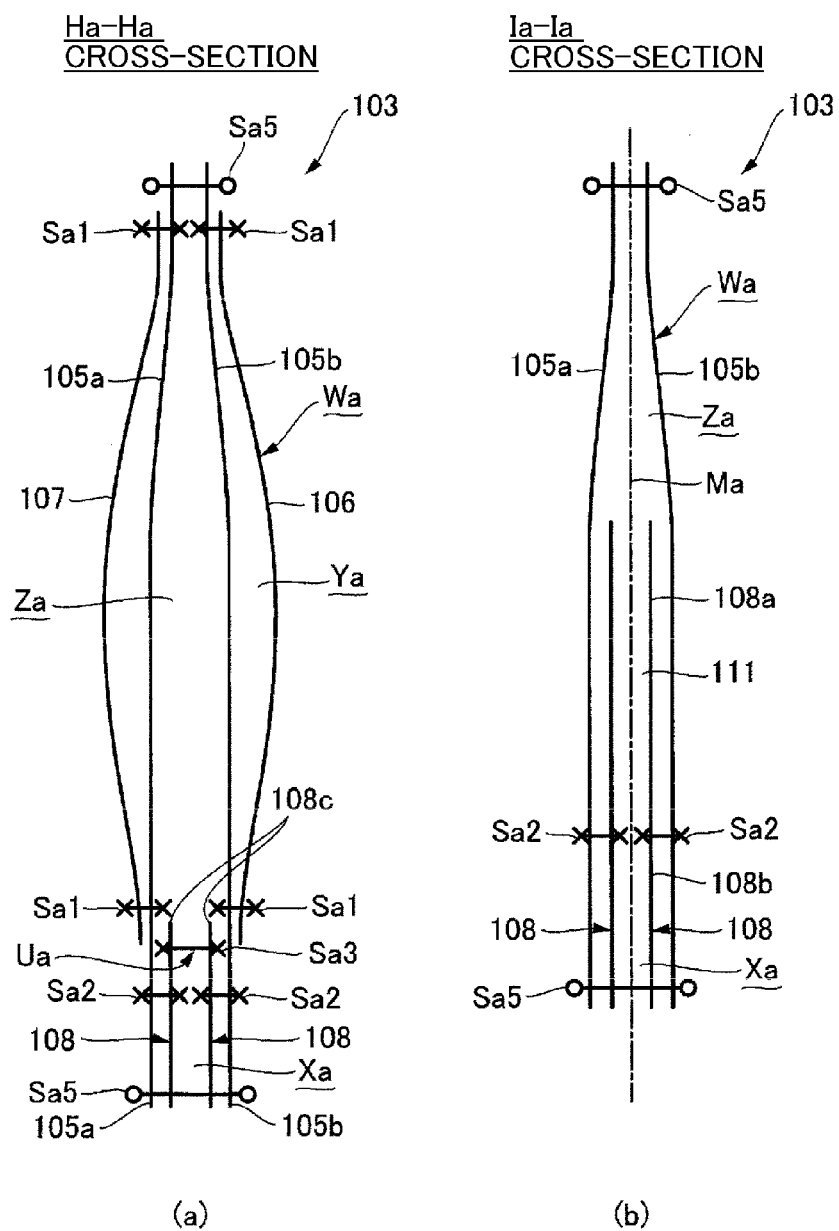
FIG. 21a is a cross-sectional diagram taken along an Ha-Ha view line of FIG. 10.
FIG. 21b is a cross-sectional diagram taken along an Ia-Ia view line of FIG. 10.

FIG. 21Aa is a cross-sectional diagram taken along an Ha-Ha view line of FIG. 10. The lower edge sections of the exterior-side panel 105a and the interior-side panel 105b are sealed off, together with the additional panel 108, by the fifth joint Sa5. The lower bag region X is formed between the fifth joint Sa5 and the third joint Sa3 (top-bottom partitioning section U). The upper edge sections of the exterior-side panel 105a and the interior-side panel 105b are sealed off, by the fifth joint Sa5, above the third joint Sa3 (top-bottom partitioning section U). The upper rear bag region Z is formed as a result.

FIG. 21b is a cross-sectional diagram taken along an Ia-Ia view line of FIG. 10. In the vicinity of the fold line Ma, the inflator mounting duct 111 connects the upper rear bag region Z with the lower bag region X, inside the side airbag 103 that has the upper edge section and lower edge section thereof sealed off by the fifth joint Sa5.

Figure 22:
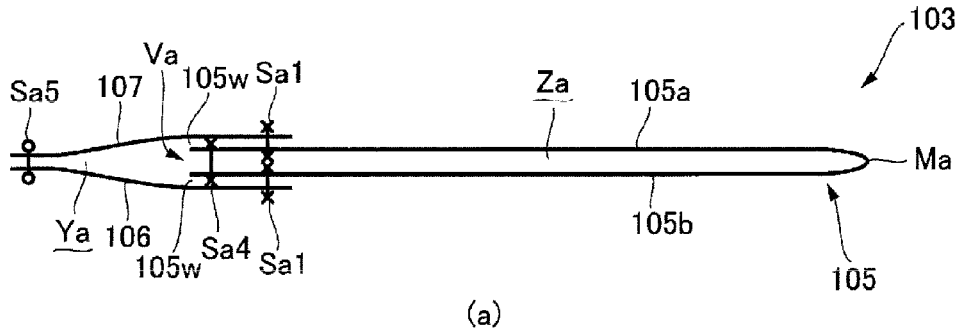
FIG. 22a is a cross-sectional diagram taken along a Ja-Ja view line of FIG. 10.
FIG. 22b is a cross-sectional diagram taken along an Ka-Ka view line of FIG. 10.
FIG. 22c is a cross-sectional diagram taken along an La-La view line of FIG. 10.
Figure 22:
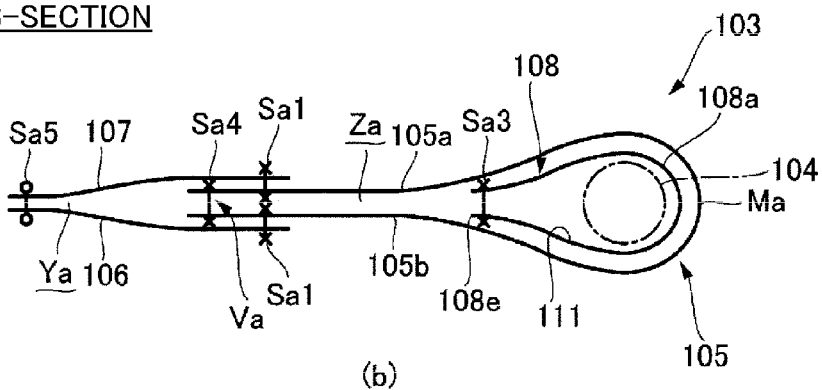
Figure 22:
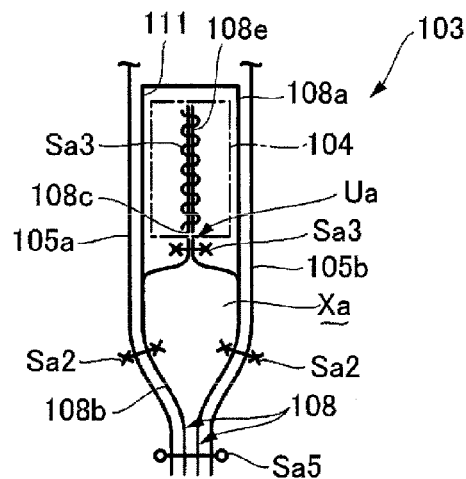

FIG. 22a is a cross-sectional diagram taken along a Ja-Ja view line in FIG. 10. The complementary interior-side panel 106 and the complementary exterior-side panel 107 are sealed off, by the fifth joint Sa5, closer to the vehicle front than the fourth joint Sa4 (front-rear partitioning section V). The upper front bag region Y is formed as a result. The first joint Sa1 that joins the complementary panels 106, 107 to the exterior-side panel 105a and the interior-side panel 105b is positioned closer to the vehicle rear than the fourth joint Sa4.

Specifically, the complementary panels 106, 107 extend towards the vehicle front further than the front-rear partitioning section V. The upper front bag region Y is formed, on the vehicle-front side of the front-rear partitioning section V, through joining of the end edges of the complementary panels 106, 107, on the vehicle-front side, by the fifth joint Sa5.

FIG. 22b is a cross-sectional diagram taken along a Ka-Ka view line in FIG. 10. Regarding the upper rear bag region Z and the upper front bag region Y, the inflator mounting duct 111 is formed, by the third joint Sa3, taking the arrangement portion of the inflator mounting duct 111 as a reference, inside the upper rear bag region Z, on the vehicle-rear side, such that the upper rear bag region Z spreads on the vehicle-front side of the inflator mounting duct 111. The upper rear bag region Z is sealed off by the fourth joint Sa4 (front-rear partitioning section V), and the upper front bag region Y spreads on the vehicle-front side of the upper rear bag region Z.

The vehicle-rear side of the upper front bag region Y is sealed off by the first joint Sa1, and the vehicle-front side is sealed off by the fifth joint Sa5. As described below, the inflator gas flows from the upper rear bag region Z into the upper front bag region Y, via the front-rear direction vent 112.

Regarding the respective overlap sites 109 of the interior-side panel 105b and the exterior-side panel 105a in the upper rear bag region Z, and the complementary panels 106, 107 in the upper front bag region Y, the overlap sites 109 hinders the flow of the inflator gas that flows from the upper rear bag region Z into the upper front bag region Y when the complementary panels 106, 107 are positioned inward of the interior-side panel 105b and the exterior-side panel 105a. In the second embodiment, however, the complementary panels 106, 107 are positioned outward the interior-side panel 105b and the exterior-side panel 105a, and hence the inflator gas can flow into the upper front bag region Y smoothly, with unimpeded flow.

FIG. 22c is a cross-sectional diagram taken along an La-La view line of FIG. 10. The additional panel 108 is provided overlapping the inner faces of both the interior-side panel 105b and the exterior-side panel 105a, by way of the second joint Sa2, in the lower bag region X. The opposing additional panel 108 is joined together, by the third joint Sa3 that forms the top-bottom partitioning section U. The additional panel 108 is further sealed off by the fifth joint Sa5, together with the interior-side panel 105b and the exterior-side panel 105a. Thereby, the inflator gas flows from the inflator 104 into the lower bag region X, between the fifth joint Sa5 and the third joint Sa3. The inflator gas flows, as a matter of course, also into the upper rear bag region Z, via the inflator mounting duct 111.

The side airbag 103 thus configured is set so that, when deployed and inflated by the inflator gas, the lower bag region X is positioned at the periphery of the occupant's waist, the upper rear bag region Z is positioned in the vicinity of the occupant's shoulder, and the upper front bag region Y is positioned at the periphery of the occupant's chest.

Figure 23:
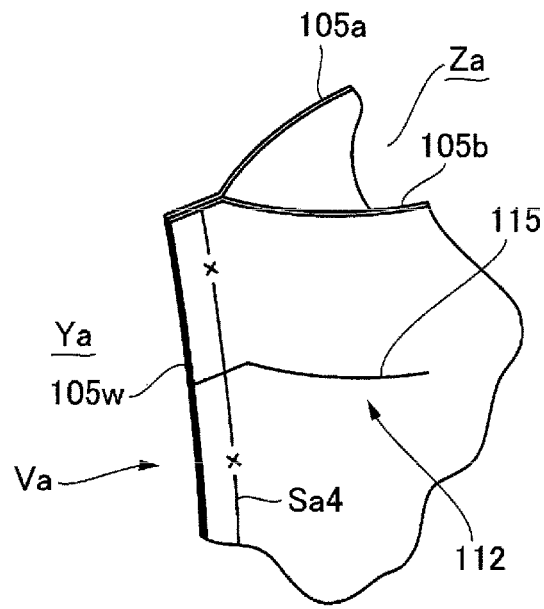
FIG. 23(a,b) is a set of explanatory diagrams of a front-rear direction vent used in the side airbag of FIG. 10, where
Figure 23:
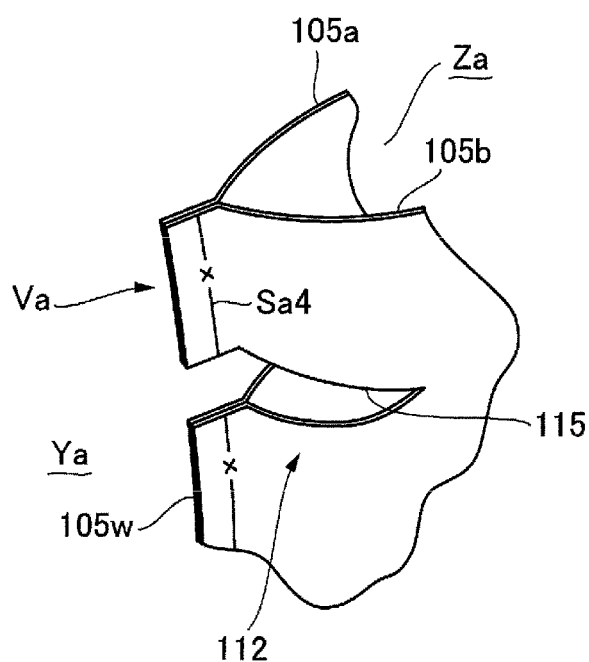

FIG. 23(a,b) illustrates the front-rear direction vent 112 formed by the slit 115. FIG. 23A illustrates the slit 115 in a closed state, and FIG. 23B in an open state. The slit 115 is formed by making a cut, intersecting the fourth joint Sa4, from the vehicle front-side end edge 105w of the interior-side panel 105b and the exterior-side panel 105a.

In the process whereby the side airbag 103 deploys and inflates from a folded state, the slit 115 opens readily when no strong tension acts on the site of the fourth joint Sa4, and closes when strong tension acts thereupon. For instance, the slit 115 opens in the deployment process of the upper rear bag region Z, and closes when deployment and inflation are substantially complete. Further, the slit 115 opens when a yet stronger tension is generated along the fourth joint Sa4, as a result of the occupant being caught by the side airbag 103. Through opening of the slit 115, the inflator gas flows from the upper rear bag region Z into the upper front bag region Y.

Figure 24:
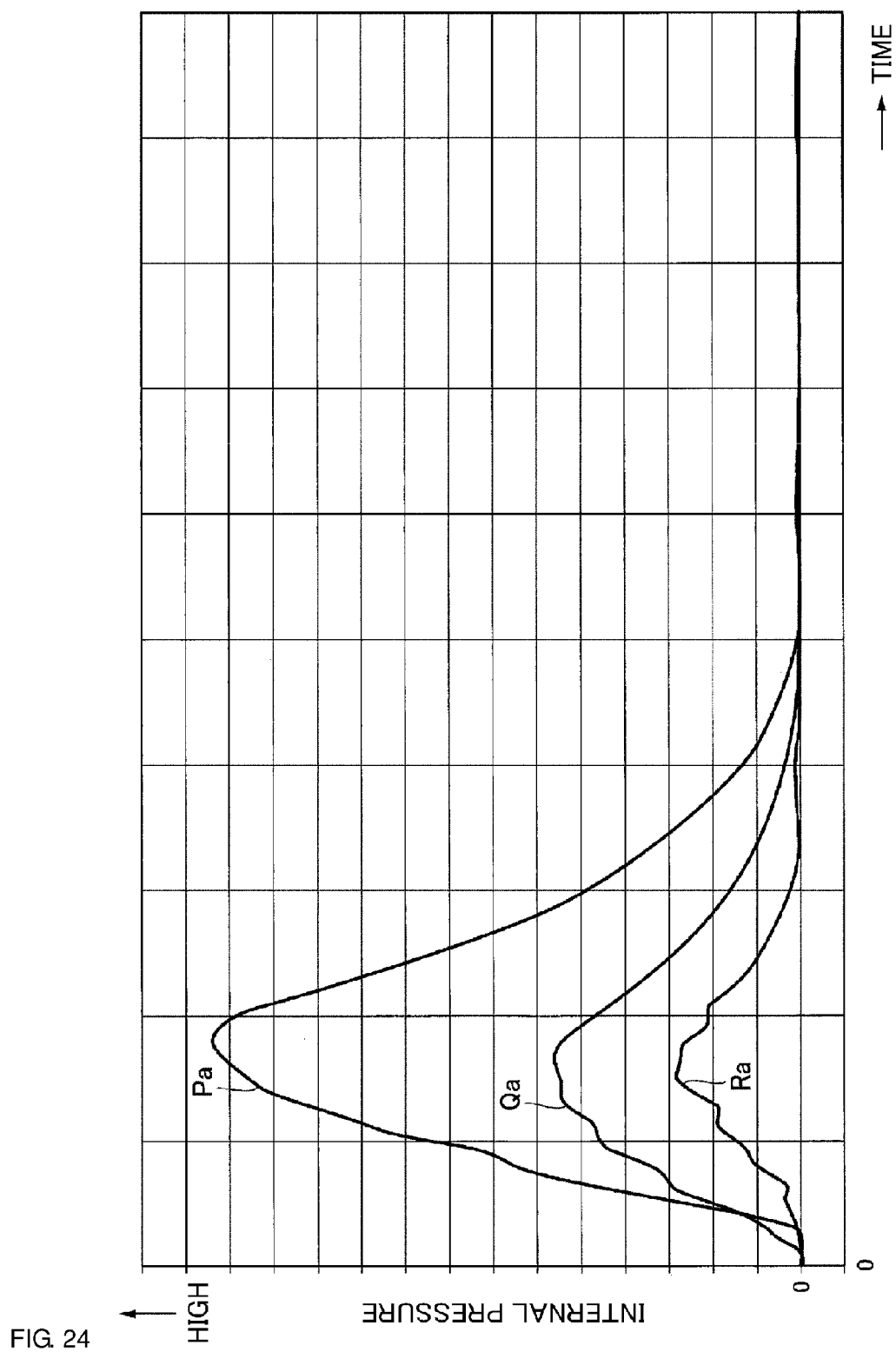
FIG. 24 is a graph for explaining the effect of the vehicular side airbag device illustrated in FIG. 9.

The effect of the vehicular side airbag device 101 according to the second embodiment will be explained next FIG. 24. The horizontal axis of the graph illustrated in FIG. 24 represents time, and the vertical axis represents internal pressure. The reference symbol Pa denotes internal pressure change in the lower bag region X, Qa represents internal pressure change in the upper rear bag region Z, and Ra represents internal pressure change in the upper front bag region Y.

The gas jetting hole 104a of the inflator 104 is set on the lower bag region X side, upon start of inflow of the inflator gas into the side airbag 103. As a result, the internal pressure in the lower bag region X rises instantly and reaches a peak. The inflator gas flows into the upper rear bag region Z as well, via the inflator mounting duct 111.

Moreover, the internal pressure of the upper rear bag region Z reaches a peak at substantially the same timing as that of the lower bag region X, but the rise in internal pressure is gentler than that in the lower bag region X. The inflator gas that flows into the upper rear bag region Z flows into the upper front bag region Y through the open front-rear direction vent 112. The internal pressure of the upper front bag region Y as well reaches a peak at substantially the same timing as that of the lower bag region X, but the rise in internal pressure is gentler than that in the upper rear bag region Z. The rise in internal pressure of the upper rear bag region Z is kept low also by virtue of the outflow of inflator gas into the upper front bag region Y.

The side airbag 103 delivers maximum occupant protection performance at the point in time at which the internal pressure in the regions X to Z reaches a peak. Thereafter, the inflator gas is gradually released from a gas release section (not shown) that is formed in the side airbag 103, and the internal pressure drops.

As the graph illustrates, in the side airbag 103 that is used in the second embodiment and that is provided with the three bag regions X to Z, it becomes possible to make highest the internal pressure of the lower bag region X that catches and protects the periphery of the occupant's waist. The internal pressure of the upper rear bag region Z that catches and protects the periphery of the occupant's shoulder is second in height, while the internal pressure of the upper front bag region Y that catches and protects the periphery of the occupant's chest can be set to be lowest. As a result, an optimal internal pressure for each portion of the body of the occupant can be set in the side airbag 103, and occupant protection performance can be enhanced.

The internal pressure of the three regions X to Z can be properly modified when the side airbag 103 catches the occupant. For instance, the internal pressure of the upper rear bag region Z rises when the upper rear bag region Z catches the shoulder of the occupant. At the same time, the front-rear direction vent 112 opens, and the inflator gas inside the upper rear bag region Z flows into the upper front bag region Y. As a result, the internal pressure in the upper front bag region Y can be increased somewhat, and there can be enhanced the cushioning effect of catching the chest of the occupant.

The front-rear partitioning section V and the top-bottom partitioning section U are formed at least at the exterior-side panel 105a and the interior-side panel 105b, and joint sites are not intricate. Therefore, the side airbag 103 can be produced easily, and the strength required from the side airbag 103 can be secured.

In a case where, for instance, the interior of the side airbag is formed into three regions by using partition plates in the form of separate components, it is difficult to join the intersections of the T-shaped top-bottom partitioning portion and the front-rear partitioning portion with the necessary strength.

Case 1

When the other partition plate that forms the front-rear partitioning portion is joined to the top-bottom partitioning portion formed of one partition plate, leaking occurs, through the resulting intersection, between the upper rear bag region and the upper front bag region.

Case 2

When the upper front bag region is surrounded by one partition plate (when there is formed the frontward site of the front-rear partitioning portion and the top-bottom partitioning portion), and the other partition plate is joined to the one partition plate, to form thereby the rearward site of the top-bottom partitioning portion, leaking occurs, through the resulting intersection, between the upper rear bag region and the lower bag region.

Case 3

When the upper rear bag region is surrounded by one partition plate (when there is formed the rearward site of the front-rear partitioning portion and the top-bottom partitioning portion), and the other partition plate is joined to the one partition plate, to form thereby the frontward site of the top-bottom partitioning portion, leaking occurs, through the resulting intersection, between the upper front bag region and the lower bag region.

It is therefore difficult to form the three regions, in a sealed-off state, inside the side airbag, using partition plates that are separate components. Further, leaking gaps arise in all cases, and the necessary strength is difficult to secure.

In the vehicular side airbag device 101 according to the second embodiment, by contrast, the side airbag 103 comprising the three regions X to Z can be configured using basically only the panels (exterior-side panel 105a, interior-side panel 105b, and complementary panels 106, 107) that make up the outline of the side airbag 103, and occupant protection performance can be significantly improved.

A double structure is achieved by providing the additional panel 108 at the lower bag region X where internal pressure rises the most. Therefore, the strength of the side airbag 103 can be thus further enhanced.

The inflator mounting duct 111 is provided, and hence the inflator 104 can be attached properly, and the inflator gas can flow properly into the lower bag region X and the upper rear bag region Z.

In the above second embodiment, an instance has been explained in which the front-rear direction vent 112 is formed, but an openable and closable top-bottom direction vent 113 that allows the lower bag region X to communicate with the upper front bag region Y can be formed additionally in the top-bottom partitioning section U, as illustrated in FIG. 9 and the FIG. 10.

The top-bottom direction vent 113 as well may be a slit 114. This way, the inflator gas can be additionally fed from the lower bag region X that catches the waist of the occupant, into the upper front bag region Y that catches the chest of the occupant. The protection performance of catching the occupant's chest can thus be further enhanced.

Figure 25:
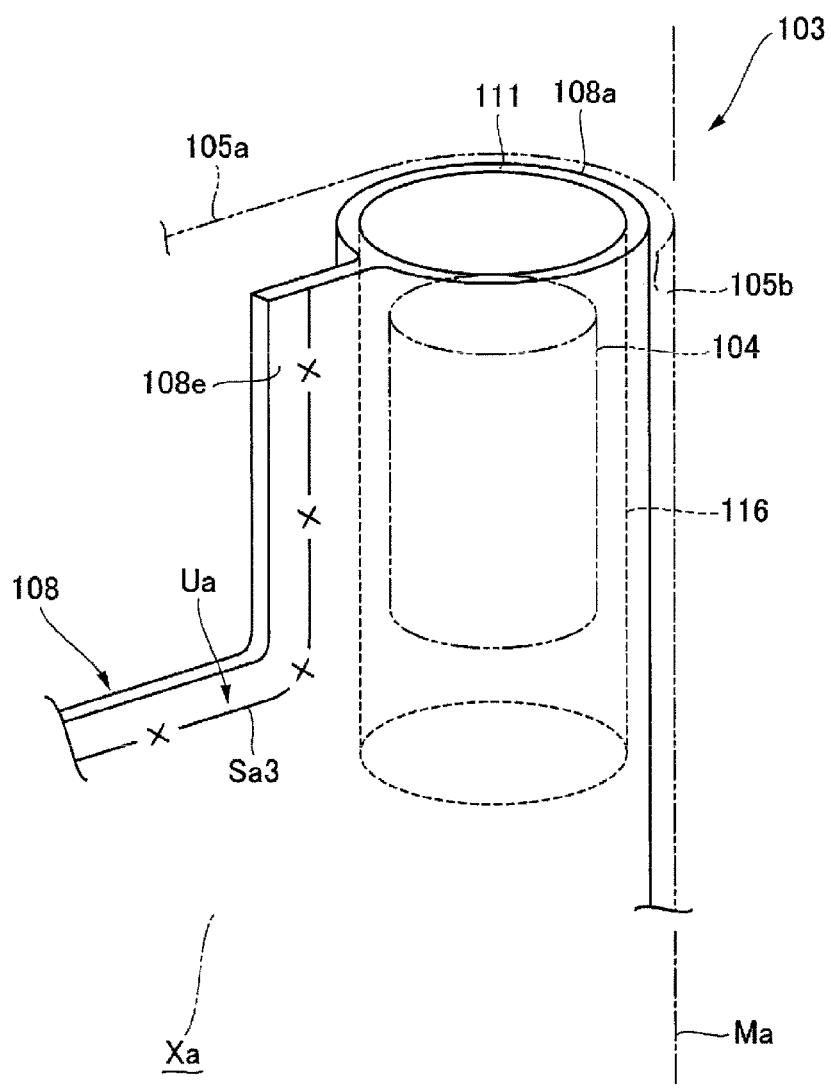
FIG. 25 is a perspective-view diagram of the manner in which a sealing valve is built into an inflator mounting duct, depicting a variation of the vehicular side airbag device depicted in FIG. 9.

FIG. 25 illustrates a variation of the vehicular side airbag device 101 according to the second embodiment. In this variation, a sleeve-like sealing valve 116 is provided extending further downward than the inflator 104, inside the inflator mounting duct 111. The sealing valve 116 is formed of a flexible material.

The sealing valve 116 is sealed off by collapsing due to the raised internal pressure in the lower bag region X, so that inflow of the inflator gas into the lower bag region X is discontinued as a result. After the sealing valve 116 closes, therefore, the inflator gas flows, in one direction, into the upper rear bag region Z. As a result, it becomes possible to prevent breakage due to excessive rise in the internal pressure of the lower bag region X, and to feed the inflator gas properly to the upper rear bag region Z and the upper front bag region Y, whereby the shoulder and chest can be protected reliably.

Although not illustrated in the figures, the sealing valve 116 may be provided in the top-bottom partitioning section U, in addition to being provided in the inflator mounting duct 111, or instead of being provided in the inflator mounting duct 111. By providing the sealing valve 116 in the top-bottom partitioning section U, it becomes likewise possible to prevent breakage due to excessive rise in the internal pressure of the lower bag region X, and to feed the inflator gas properly to the upper rear bag region Z and the upper front bag region Y, whereby the shoulder and chest can be protected reliably.

In a case where the sealing valve 116 is provided, the top-bottom direction vent 113 is preferably omitted, in order to maintain the internal pressure in the lower bag region X.

Throughout the present application, the joining method may be any method, for instance sewing, bonding, fusion or the like.

The vehicular side airbag device explained above is a preferred example of the present invention, but embodiments other than the foregoing can be implemented or achieved in accordance with various methods. In particular, the invention is not restricted by the shape, size, configurational arrangement and so forth of the detailed parts depicted in the drawings unless limiting matter to the effect is set forth in the description of the present application. Further, the expressions and terms used in the description of the present application are explanatory in purpose, and are not meant to be limiting in any way, unless restricting matter to that effect is specifically set forth.

While the above description constitutes the preferred embodiment of the present invention, it will be appreciated that the invention is susceptible to modification, variation and change without departing from the proper scope and fair meaning of the accompanying claims.

What is claimed is:

1. A vehicular side airbag device that has a side airbag built into a seat and that, due to introduction of an inflator gas from an inflator, deploys and inflates, in a direction from a vehicle rear towards a vehicle front, into a gap between an occupant and a vehicle side section comprising;
wherein inside the side airbag there are provided
a rapid chamber extending from a seat back region over a top region of the side airbag and a bottom region of the side airbag, the rapid chamber tapering gradually towards the vehicle front,
a delay chamber positioned between the top region and the bottom region on a vehicle-front side of the seat back region, and
a front-rear partitioning section that partitions the interior of the side airbag into the delay chamber and the rapid chamber; and
the inflator is provided inside the rapid chamber;
wherein the delay chamber is defined by a first panel and a second panel, wherein the first panel is joined to the front-rear partitioning section at a first interface and the second panel is joined to the front-rear partitioning section at a second interface, and the first and second interfaces are open to the delay chamber and blocked from the rapid chamber,
wherein the inflator gas provided by the inflator in the rapid chamber defines an initial gas flow, and gas flow in the delay chamber defines a second gas flow that is subsequent to the initial gas flow, wherein the initial gas flow is blocked from the first and second interfaces.

2. The vehicular side airbag device according to claim 1, wherein the front-rear partitioning section is provided with at least one of an upper communication port through which the top region communicates with the delay chamber, and a lower communication port through which the bottom region communicates with the delay chamber.

3. The vehicular side airbag device according to claim 1, wherein the width of the front-rear partitioning section, in the vehicle width direction, is larger at a position in the seat back region than at a position in the top region and the bottom region.

4. The vehicular side airbag device according to claim 1, wherein the front-rear partitioning section is convexly curved upwardly and obliquely rearward with respect to the vehicle front-rear direction, at a portion of transition from the seat back region to the top region, and the front-rear partitioning section is convexly curved downwardly and obliquely rearward with respect to the vehicle front-rear direction, at a portion of transition from the seat back region to the bottom region.

5. The vehicular side airbag device according to claim 1, wherein a top-bottom partitioning section that partitions the rapid chamber into an upper rear bag region that includes the top region and into a lower bag region that includes the bottom region is provided inside the side airbag.

6. The vehicular side airbag device according to claim 5, wherein a supplementary communication port through which the seat back region communicates with the bottom region is provided in the top-bottom partitioning section.

7. The vehicular side airbag device according to claim 5, wherein a duct that guides the inflator gas in a direction from the vehicle rear towards the vehicle front is provided in the top-bottom partitioning section.

8. The vehicular side airbag device according to claim 5, wherein the angle formed by the top-bottom partitioning section and the front-rear partitioning section, with respect to the vehicle-rear side, is an acute angle.

9. The vehicular side airbag device according to claim 5, wherein a sealing valve that is sealed off due to a rise in internal pressure in the lower bag region of the rapid chamber is provided in the top-bottom partitioning section.

10. A vehicular side airbag device that has a side airbag built into a seat and that, due to introduction of an inflator gas from an inflator, deploys and inflates in a direction from a vehicle rear towards a vehicle front, between an occupant and a vehicle side section, the vehicular side airbag device comprising:
a top-bottom partitioning section formed inside the side airbag in a vehicle front-rear direction, and divides the interior of the side airbag into a lower bag region and an upper bag region;
a front-rear partitioning section formed inside the side airbag, from the top-bottom partitioning section towards the top of the vehicle, and that divides the upper bag region into an upper front bag region and an upper rear bag region, wherein the lower bag region and the upper rear bag region form a rapid chamber, and the upper front bag region forms a delay chamber;

the inflator is disposed, on the vehicle-rear side inside the rapid chamber, from the upper rear bag region over the lower bag region; and a front-rear direction vent that allows the upper rear bag region of the rapid chamber to communicate with the delay chamber is provided in the front-rear partitioning section;

wherein the side airbag further comprises at least an exterior-side panel and an interior-side panel, forming the front-rear partitioning section through joining of the exterior-side panel and the interior-side panel;

a complementary exterior-side panel and a complementary interior-side panel that are respectively joined via interfaces to the outer side of the exterior-side panel and the outer side of the interior-side panel;

the complementary panels extend towards the vehicle front further than the front-rear partitioning section; and the delay chamber is formed on the vehicle-front side of the front-rear partitioning section, through joining of the complementary panels to each other;

wherein gas pressure in the delay chamber directly contacts the interfaces, and the interfaces are blocked from gas pressure in the rapid chamber.

11. The vehicular side airbag device according to claim 10, wherein the front-rear partitioning section is formed through joining of a first overlap site where the exterior-side panel and the complementary exterior-side panel overlap, to a second overlap site where the interior-side panel and the complementary interior-side panel overlap.

12. The vehicular side airbag device according to claim 10, wherein an additional panel is provided, overlapping inner faces of the exterior-side panel and the interior-side panel, in the lower bag region of the rapid chamber, and the top-bottom partitioning section is formed through joining of opposing sides of the additional panel.

13. The vehicular side airbag device according to claim 12, wherein the additional panel forms an inflator mounting duct from the lower bag region of the rapid chamber over the upper rear bag region, inside the side airbag, and a sealing valve that is sealed off due to a rise in internal pressure in the lower bag region is provided in the inflator mounting duct.

14. The vehicular side airbag device according to claim 12, wherein a sealing valve that is sealed off due to a rise in internal pressure in the lower bag region of the rapid chamber is provided in the top-bottom partitioning section.

15. The vehicular side airbag device according to claim 10, wherein a top-bottom direction vent that allows the lower bag region of the rapid chamber to communicate with the delay chamber is provided in the top-bottom partitioning section.

16. The vehicular side airbag device according to claim 10, wherein a gas jetting hole of the inflator is set, in the rapid chamber, on the side of the lower bag region.

17. The vehicular side airbag device according to claim 10, wherein the side airbag is set so that the lower bag region of the rapid chamber is positioned completely below an upper edge of a seat back of the seat, the upper rear bag region of the rapid chamber is positioned completely above a seat cushion of the seat, and the delay chamber is positioned completely in front of the seat back.

18. The vehicular side airbag device according to claim 10, wherein the front-rear direction vent is a slit.

19. A method of manufacturing a side airbag, the method comprising the steps of:

providing an exterior-side panel portion of a side airbag and an interior side panel portion;

joining an interior surface of the exterior side-panel portion to an interior surface of the interior side-panel portion via a seam thereby defining a front-rear partition section;

overlaying a complementary exterior-side panel over a front portion of the exterior-side panel portion and joining an inner surface of the complementary exterior-side panel to an outer surface of the exterior-side panel portion at an exterior-side interface;

overlaying a complementary interior-side panel over a front portion of the interior-side panel portion and joining an inner surface of the complementary interior-side panel to an outer surface of the interior-side panel portion at an exterior-side interface;

wherein the interior-side panel portion, exterior-side panel portion, and front-rear partition section combine to define a rapid chamber;

wherein the complementary interior-side panel, the complementary exterior-side panel, and the front-rear partition section combine to define a delay chamber disposed forward relative to rapid chamber; and wherein the interior-side interface and the exterior-side interface are open to the delay chamber and blocked from the rapid chamber.

* * * * *